United States Patent
Van Den Bulcke et al.

[11] Patent Number: 6,116,126
[45] Date of Patent: *Sep. 12, 2000

[54] METHOD AND MACHINE FOR MAKING PROFILE PIECES

[76] Inventors: Marc Van Den Bulcke, 892 Buchanan, Ville St. Laurent, Quebec, Canada, H4L 2V1; Hartmut Federhenn, Sponheimer Ring 3, D-55469 Simmern/Hunsruck, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/676,690

[22] Filed: Jul. 10, 1996

[51] Int. Cl.⁷ .................. B26D 1/00; B26D 7/06
[52] U.S. Cl. .................. 83/13; 83/39; 83/151; 83/206; 83/277; 83/282
[58] Field of Search .............. 83/581, 151, 206, 83/277, 477.1, 471.3, 39, 282, 272, 54, 13

[56] References Cited

U.S. PATENT DOCUMENTS

| | | | |
|---|---|---|---|
| 2,422,843 | 6/1947 | Mooradian | 83/477.1 |
| 3,182,538 | 5/1965 | Whitmore et al. | 83/277 X |
| 3,540,498 | 11/1970 | Woloveke et al. | 83/471.1 |
| 3,665,982 | 5/1972 | Kvalheim | 83/471.1 X |
| 3,686,990 | 8/1972 | Margolien | 83/581 X |
| 3,707,103 | 12/1972 | Tishken | 83/113 |
| 3,835,743 | 9/1974 | Taylor et al. | 83/277 X |
| 3,851,557 | 12/1974 | Vierstraete | 83/581 X |
| 3,857,313 | 12/1974 | Endo | 83/151 X |
| 3,945,282 | 3/1976 | Aizawa | 83/277 X |
| 4,448,099 | 5/1984 | Kuroda et al. | 83/277 X |
| 4,574,670 | 3/1986 | Johnson | 83/471.3 X |
| 4,576,076 | 3/1986 | Pyle | 83/471.3 |
| 4,640,161 | 2/1987 | Kurk | 83/471.1 X |
| 4,823,662 | 4/1989 | Stolzer | 83/277 X |
| 5,315,906 | 5/1994 | Ferenczi et al. | 83/452 X |

*Primary Examiner*—M. Rachuba

[57] ABSTRACT

A method for use in making profile pieces. The method has the steps of feeding a profile into a work station, clamping the profile in the work station, and cutting it into a profile piece and a profile remainder. The profile piece is repositioned in the work station for further work by operably connecting it to the profile remainder while both the profile piece and the profile remainder are clamped, and moving the profile remainder. The invention also covers a machine for carrying out the method.

9 Claims, 16 Drawing Sheets

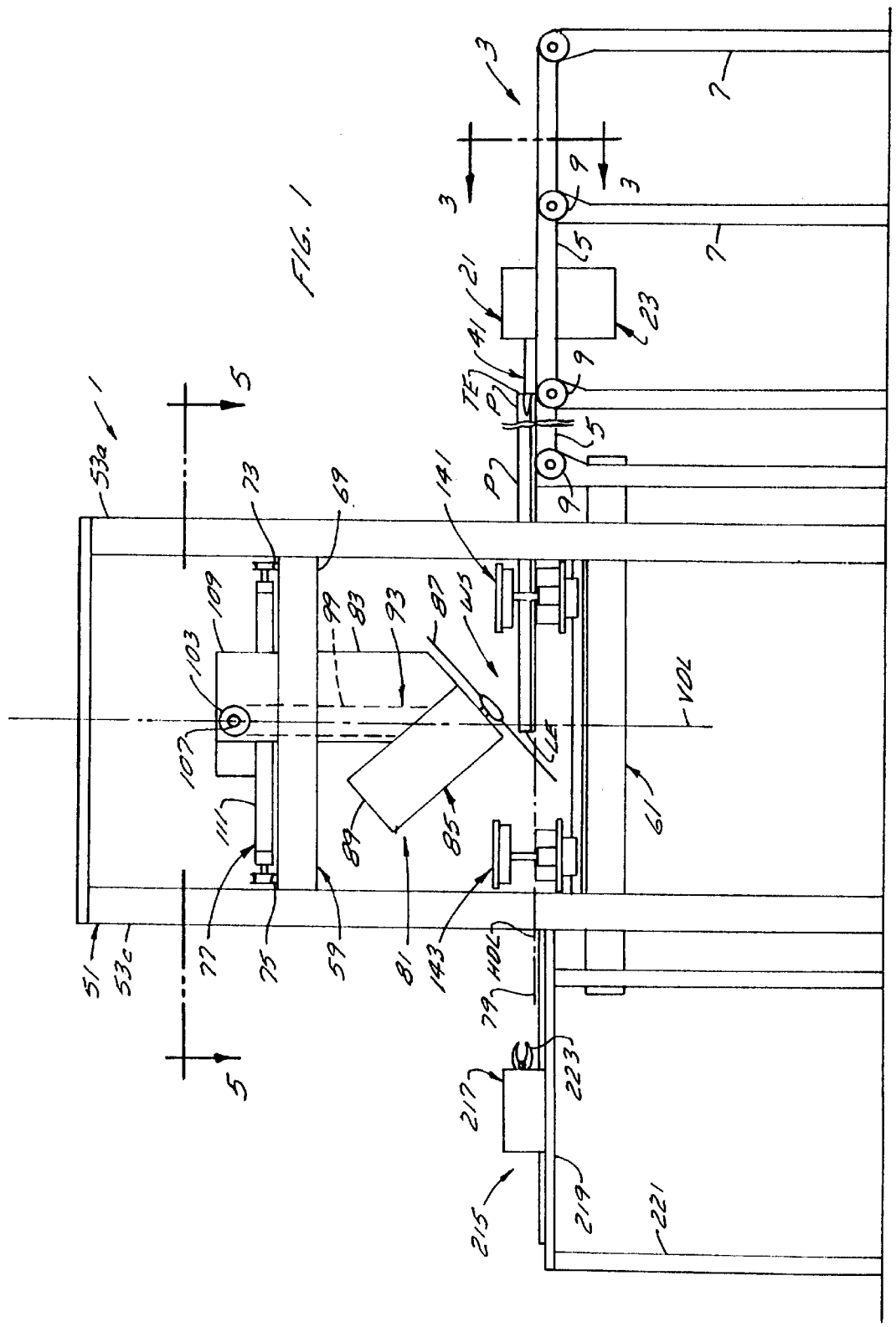

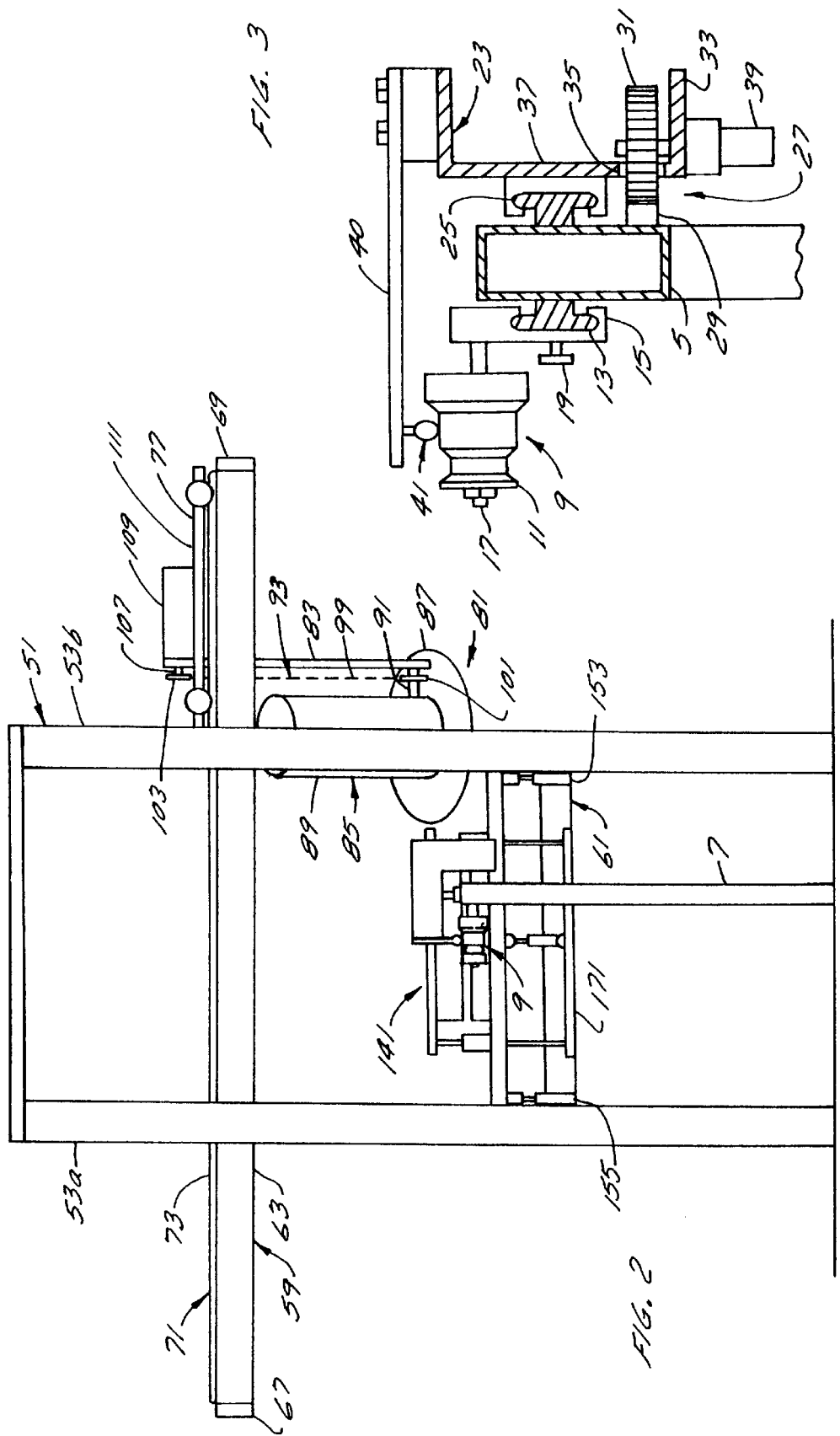

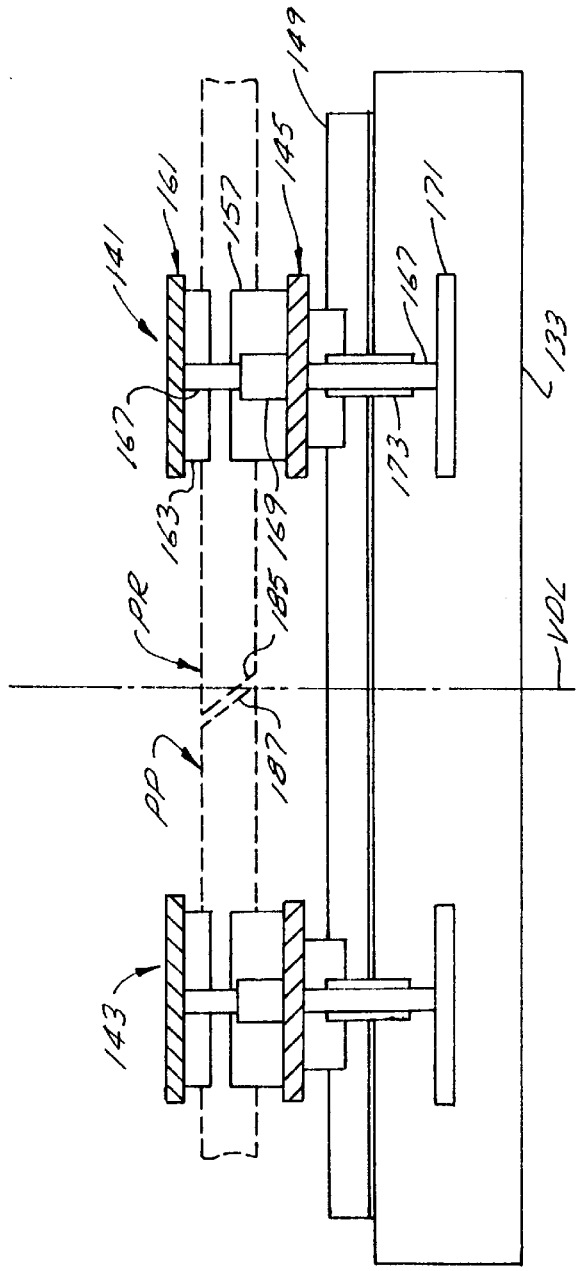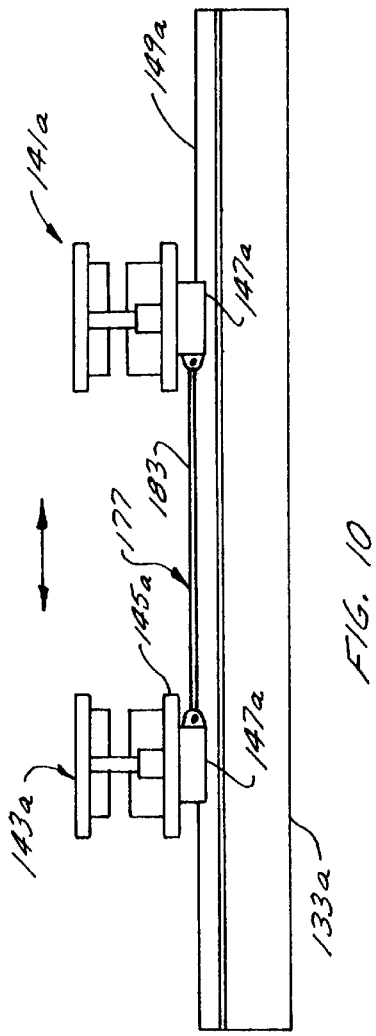

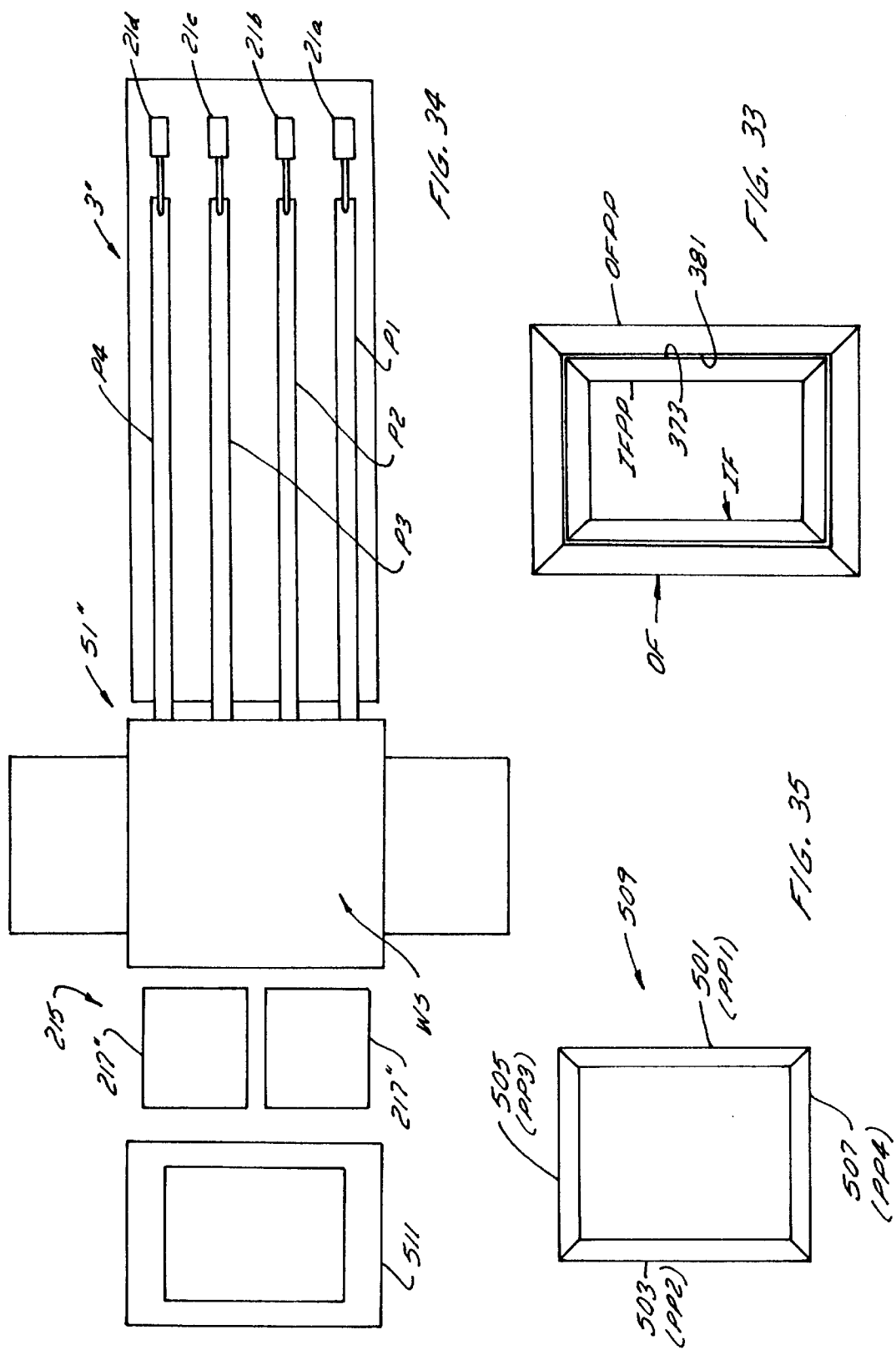

METHOD AND MACHINE FOR MAKING PROFILE PIECES

BACKGROUND OF THE INVENTION

1. Field of the Invention

This invention is directed toward an improved method for use in making profile pieces from profiles and to a machine for carrying out the method.

The invention is also directed toward specific profile blocks used on the machine to clamp profiles and to a method and a system for making frame units using the machine with the profile blocks.

2. Description of Related Art Including Information Disclosed Under 37 CFR §§ 1.97 and 1.98

Profiles are rigid, construction members having various cross-sectional shapes that are cut, and otherwise worked, into profile pieces which are used in industry to form various products. The profiles can be formed by different processes such as extruding, roll forming, molding, pultrusion, planing, etc. The profiles can be made from different materials or even combined materials such as, for example, co-extruded plastics or thermally broken aluminum profiles. Usually, the ends of each profile piece are cut at an angle which varies depending on the angle of the assembled corner between adjacent profile pieces and/or the assembling method. If the two cut ends of two profile pieces have to match exactly when abutting, both ends have to be cut at the same angle. If the two cut ends of two profile pieces do not have to match exactly when abutting, they can be cut at different angles such as, for example at 30° and 60°. Usually the ends are cut at 45°. After the ends are cut, the profile pieces can be end-milled, punched or drilled, or have a combination of these operations, or other operations, performed thereon. The profile pieces are then joined together by suitable fastening means. Often, the profile pieces are used to form frames.

It is known to provide machines to cut the profiles into profile pieces of desired length with the ends of the pieces mitered at 45°. One such machine uses a single cut-off saw blade the angle of which is adjustable. The saw blade can be set at an angle of 45° to the left or right of center. The saw is typically a chop-type saw with the blade movable up and down about a pivot. The saw usually has a fixed clamp on each side of the saw blade for holding the profile. The single cut-off saw blade cuts the profile at a 45° angle to form a profile piece and a profile remainder with adjacent cut ends. However, if more complicated operations, such as double miter cuts to form the cut end on the profile piece into a pointed mullion end, are required, the profile piece must be unclamped, repositioned and clamped again before a second cut can be made. If other operations on the cut end, such as drilling, are required, the profile piece must be unclamped and moved to another machine where it is again clamped in position for drilling. All the clamping, unclamping and movement of the profile piece are time consuming and inefficient.

It is also known to provide machines having two saw heads that can be moved relative to one another for cutting profiles. One head can be fixed while the other head moves, or the heads can move in unison toward or away from each other relative to a central, vertical, datum line. The angle of the saw blade on each saw head can be changed. Fixed profile clamps are provided on each head. Once this machine is set up, with the saw blade on one head at 45° left, for example, and the saw blade on the other head at 45° right, for example, and the saw heads the required distance apart, all that is necessary is to clamp the profile in the heads to cut a profile piece with miter ends and of the required length. However, this machine is still limited in the operations that can be done on the profile piece. More complicated cuts require at least one head to be unclamped, the head repositioned, and reclamped; or to have the profile unclamped, repositioned and reclamped. The profile piece must be moved to other, separate machines for drilling or notching operations which requires additional handling of the pieces thus slowing production.

It is further known to provide a machine with a set of tool heads arranged in series, one tool head at each work station, that can perform different operations, including cutting, in sequence on the profile elements. For example, machines are known where a profile is moved to one work station having a tool head which is a saw head; clamped and miter cut left by the saw head at the leading end; unclamped; moved along to a second work station having a tool head which might, for example, be a drill head; clamped and drilled by the drill head at a specific location; unclamped and moved along to a third work station having a tool head which is again a saw head; clamped; and miter cut right to produce a profile piece. If desired, this profile piece can be moved to other work stations, in the same machine, or in another machine, for further drilling and/or for notching and/or for other operations. This type of machine greatly increases productivity but still requires a lot of handling of the profile elements particularly when moving them between the various work stations. The elements must be moved to a separate work station for each operation requiring much clamping, unclamping and movement. In addition, such machines are very expensive with all the work stations required, each with their own clamping means and work head. The machines also require a lot of floor space with the work stations linearly arranged.

Another problem with known machines, when making miter cuts, is that the length of the profiles in the machine is always measured along the same edge or surface of the profile, no matter what shape the profile has. This edge or surface can be what ends up as an outside edge or surface on profile pieces to be used in a frame which frame will fit into another frame where the length of its profile pieces is also measured as an outside edge or surface. Or, the measuring edge or surface of the profile can be what ends up as an inside edge or surface on profile pieces to be used in both inner and outer frames with the inner frame fitting in the outer frame. In either case, because both measured edges or surfaces end up either inside or outside the frames, depending on how the machine is set up, one of the adjacent edges or surfaces of the inner and outer frame members is not the measured edge or surface and thus the adjacent edges or surfaces may not exactly match if the height of the profiles are not within specific tolerances.

A further problem arises in forming products from two or more profiles. Such a product could, for example, be a frame that requires four profile pieces in its makeup. The profile pieces may differ as to length, or in the manner they are formed for fastening to each other. The different profile pieces needed to make the product, such as a frame, need to be formed, collected, sorted, moved and stored at an assembling machine where the required profile pieces are then set up in the machine in the shape of the product and then fastened together. The forming, collecting, sorting, moving and storing of the different pieces takes time and is inefficient.

SUMMARY OF THE INVENTION

It is the purpose of the present invention to provide a novel method for use in making profile pieces, and a machine for carrying out the method, that is more productive than known methods and machines. It is another purpose of the present invention to provide profile cutting machines that are more versatile than known machines. It is yet another purpose of the present invention to provide a profile cutting machine that is more efficient and faster to operate and thus manufactures profile pieces at a lower cost per unit than the known machines of the type that perform various operations, in sequence, at linearly arranged operating stations in making profile pieces. It is a further purpose of the present invention to provide profile cutting machines that are more compact, requiring less floor space than known machines and that more easily and simply handle the profiles and profile pieces and the scrap material developed than known machines. It is yet a further purpose of the present invention to provide profile cutting machines to form profile pieces to be used in frames which are mounted within each other and where the inside and outside dimensions of the frames are critical to obtain a close fit between the frames. It is another purpose of the present invention to provide a profile piece forming machine that can simultaneously produce the various profile pieces needed in forming a frame so that the pieces can be immediately set up in an adjacent assembling machine to produce the frame.

The present invention provides a method, and a machine for carrying out the method, for use in making profile pieces by performing more than one operation on the profile piece at a work station. Novel positioning means are provided for use in positioning at least the profile piece at the work station, to perform another operation on it, without having to unclamp, reposition, and reclamp the profile piece. The novel positioning means, eliminating the unclamping and reclamping of the profile pieces, provides a much more efficient method and apparatus.

The novel positioning means includes a pair of clamp units at a work station, one on each side of the work station, for clamping a profile. The clamp units are mounted for movement in a direction parallel to the profile. The novel positioning means also includes profile moving means for moving the profile into the work station and the clamp units, and connecting means for connecting the clamp units together. A saw is provided at the work station for cutting the clamped profile into two profile elements-a profile piece and a separate profile remainder. Each element is clamped by a clamp unit. The positioning means can position the separate profile piece in the work station for a second operation on it at the work station, over and above the first cutting operation. The positioning means operates by moving the profile moving means, which, through the held profile remainder, the movable clamp unit holding the profile remainder, the connecting means between the movable clamp unit holding the profile remainder and the movable clamp unit holding the separate profile piece, and the movable clamp holding the profile piece, moves the profile piece.

The second operation could, by way of example, comprise cutting the profile piece a second time at a different angle from the first cut. This second cut could be made with the same saw, after it is adjusted to the new angle, or with a second saw at the work station already set to the new angle. The second operation could comprise drilling one or both profile elements. Both profile elements could be drilled simultaneously. The second operation could comprise cutting one or both profile elements with a router. Both profile elements can be cut simultaneously by the router. More than one operation could be performed at the work station while the profile elements remain clamped, the positioning means positioning the elements as needed to carry out the operations.

The connecting means can have the clamp units moved in various ways to position the profile elements, and more particularly their adjacent ends, to achieve the desired results. The clamp units could be moved together as a single entity in either direction relative to a vertical, central datum line so that first one and then the other profile element could be operated on at the work station. The clamp units could also be moved in unison toward or away from each other and relative to a vertical, central datum line so that the profile elements could be operated on simultaneously at the work station. The connecting means could also be arranged to move the clamp units selectively either as a single entity or in unison toward or away from each other.

The machine can make two or more profile pieces at one time. To this end, the machine can have a depth allowing more than one profile to be fed into the work station at one time. In one embodiment, the clamp units have upper and lower profile blocks for clamping at least two parallel, profiles between them. The two profiles are cut by the saw at the same time forming profile pieces and profile remainders. At least the profile pieces can be positioned in the work station to have a further operation performed on them. The same novel positioning means are employed to position the profile pieces in the work station, employing profile moving means for each profile, movable clamp units, and connecting means between the clamp units.

In a specific embodiment of a machine making two profile pieces at one time, the profile blocks in the clamp units are formed so that the top surface of the bottom block abuts the bottom surface of the top block when clamping the profiles. The surfaces abut at a horizontal datum line. The bottom block can have a profile cutout in its top surface to receive profiles used to form inner profile pieces for an inner frame with the cutout designed to have the surface of the inner profile piece, that will abut an outer profile piece of an outer frame in which the inner frame fits, located at the top surface. The top block can have a profile cutout in its bottom surface to receive profiles used to form the outer frame profile pieces. The cutout is designed to have the surface of the outer frame profile piece, that will abut an inner frame piece in a finished inner frame, located at the bottom surface. Thus the two surfaces in the two profile pieces that abut are located at a horizontal datum line where the length measurements are made and thus the length of the pieces will be accurate relative to each other to provide an accurate fit of the inner frame within the outer frame.

In another embodiment of the machine, the profile blocks can hold four profiles between them. The profiles are parallel and each profile is cut into profile pieces forming one side of a frame. Each profile piece can also be worked on, independently of the other profile pieces from the other profiles, in the machine using the novel positioning means, if required, to move at least the profile pieces in the work station. A finished profile piece is collected from each profile line in the machine and the four profile pieces are placed at an assembly station immediately adjacent the profile forming machine and assembled to form a finished frame. No sorting, collecting, transporting or storage of the profile pieces is required thus increasing production.

The invention is particularly directed toward a method for use in the making of a profile piece comprising the steps of moving a profile into a work station and cutting the profile in the work station into a profile piece and a separate profile remainder with adjacent cut ends. The method includes the step of moving at least the profile piece in the work station to be able to perform another operation on its cut end in the work station. Preferably, the profile piece is moved in the work station by operably connecting it to the profile remainder and moving the profile remainder.

The invention is also particularly directed toward a machine for carrying out the above method which machine includes a work station and profile moving means for moving a profile into and in the work station. Cutting means are provided for cutting the profile in the work station to separate a profile piece from the profile remainder. Positioning means are provided for moving at least the profile piece in the work station to be able to perform another operation on the profile piece. Preferably, the positioning means includes clamp means on each side of the cutting means and means operably connecting the clamp means together so that movement of the profile remainder by the profile moving means will move the profile piece while both the profile remainder and the profile piece are clamped.

The invention is further directed toward a clamp unit for profiles having one profile block to clamp a first profile member with the surface of the profile, used to measure the length of the profile piece to be cut off, located at the clamping surface of the block. The clamp has a second profile block to clamp a second profile member, complementary to the first profile member, with the surface of the second profile, used to measure the length of the profile piece to be cut off, located at the clamping surface of the block. The two blocks clamp the two profile pieces between them with their clamping surfaces abutting.

The invention is also directed toward a profile piece making machine having support means wide enough to hold four profiles. The machine has a work station and profile moving means for each profile, or for groups of profiles, to move the profiles into and in the work station. Cutting means on the machine cut each profile in the work station to form a profile piece and a profile remainder. Unloading means unload the four profiles from the work station for assembly into a frame unit.

The invention is also directed toward a method for making a four-sided frame unit comprising the steps of feeding four profiles into a work station and cutting the profiles in the work station to form four profile pieces. The profile pieces are unloaded from the work station to an adjacent assembling station where the four profile pieces are assembled to form a frame unit.

BRIEF DESCRIPTION OF THE DRAWINGS

FIG. 1 is a side view of a profile piece making machine working on one profile;

FIG. 2 is an end view of the machine;

FIG. 3 is a detail cross-sectional view taken along line 3—3 in FIG. 1;

FIG. 9 is a detail cross-sectional view taken along line 9—9 in FIG. 8 showing both clamp units;

FIG. 10 is a detail side view showing one form of connecting means for connecting the clamp units;

FIG. 33 is a front view of a frame using profile pieces produced with the aid of the novel set of guide blocks.

FIG. 34 is a plan view of a system, including a profile making machine that makes the profile pieces, for making a frame unit from the profile pieces; and FIG. 35 is a plan view of the frame unit made by the system shown in FIG. 34.

DESCRIPTION OF THE PREFERRED EMBODIMENTS

Figure 4:
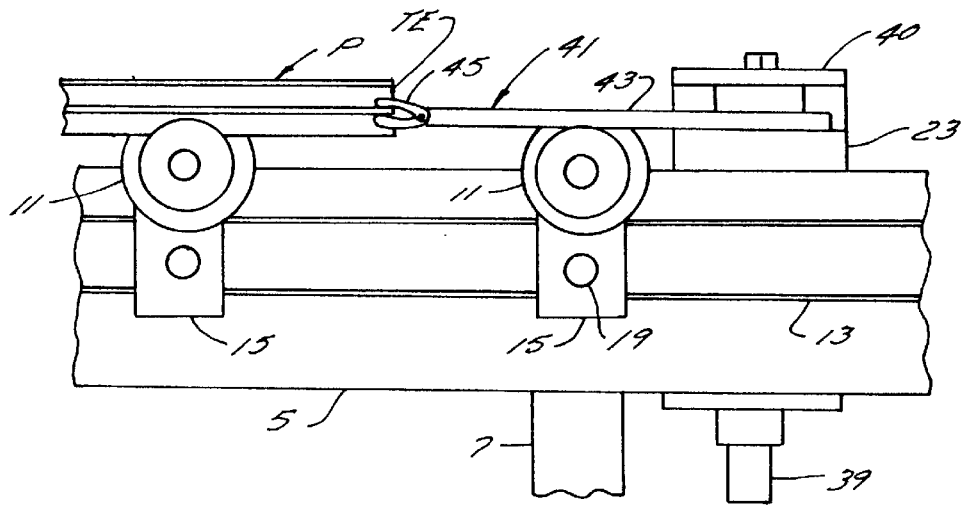
FIG. 4 is a detail front view of the profile moving means.

The profile forming machine 1, as shown in FIGS. 1 and 2, has a profile support bed 3 for horizontally supporting a profile P to be worked on. The support bed 3 can comprise an elongated, horizontal, narrow table 5 supported on legs 7. Guide means 9 are mounted on the table 5 for receiving and guiding the profile P. The profile P moves freely on, and is guided by, the guide means 9 for longitudinal movement. The guide means 9 can comprise guide rollers or wheels 11, as shown in FIG. 3, mounted on a rail 13 on one side of the table 5 by mounting blocks 15. The guide wheels 11 are connected to the mounting blocks 15 by horizontal axles 17 and rotate on the axles. The guide wheels 11 are longitudinally spaced apart on the table 5 and have a profile matching the profile to be worked on. The mounting blocks 15 are locked onto the rail 13 by suitable locking means 19. While guide wheels have been shown, the wheels could be replaced by guide blocks along which the profile would slide. Such guide blocks are known in the art. The profile guide blocks are identical and have a profile surface adapted to guide various profiles with different cross sections. The profile blocks are shaped to accurately guide the profiles longitudinally. Different sets of profile blocks could be provided to be used as needed for different profiles.

Profile moving means 21 are mounted on the table 5 for moving a profile P along the table 5. The profile moving means 21, as shown in FIGS. 3 and 4, can comprise a carriage 23 that is mounted on a rail 25 carried by the table 5 on its side opposite the side carrying the guide wheels 11. The carriage 23 is moved on the rail 25, longitudinally along the table 5 by suitable moving means 27. The moving means 27 could comprise a rack 29 and pinion 31 arrangement with the rack 29 mounted on the side of the table 5 below the rail 25. The pinion 31 is carried by the bottom wall 33 of the carriage 23 and extends through an opening 35 in the side wall 37 of the carriage to contact the rack 29. A gear and motor unit 39 is carried by the carriage 23 to selectively rotate the pinion 31. An arm 40 on the carriage 23 extends over the guide wheels 11 and carries profile holding means 41 as shown in FIG. 4. The profile holding means 41 can comprise a rigid, elongated member 43 extending forwardly from the arm 40 and generally aligned with the guide wheels 11. A pair of jaws 45 can be provided at the free end of member 43. Means (not shown) are provided on the carriage 23 for operating the jaws 45 to clamp onto the trailing end TE of a profile P to securely hold it. Instead of jaws 45, other types of holding means could be employed. Movement of the carriage 23 back and forth on the rail 25 will move a profile P, held by the jaws 45, longitudinally back and forth on the guide wheels 11 on the table 5. The guide wheels 11, being profiled to fit the particular profile P being cut, securely and accurately guide it in a longitudinal direction when it is pushed by the carriage 23 through the holding means 41. The guide wheels 11 can be easily replaced with other guide wheels having different profiles. Profile moving means of the above type are known.

The machine has a main frame 51 at one end of the support bed 3 as shown in FIGS. 1 and 2. The main frame 51 can have four vertical, corner posts 53*a*; 53*b*; 53*c* and 53*d* enclosing a work station WS within. The main frame 51 includes a top sub-frame 59, fixed to the posts 53*a*, 53*b*, 53*c*, 53*d* and extending transversely to the table 5, and a bottom sub-frame 61, fixed to the posts 53*a*, 53*b*, 53*c*, 53*d* and extending parallel to the table 5. In more detail, the top sub-frame 59 can comprise a pair of parallel beams 63, 61 extending horizontally, transverse to the posts 53*a*, 53*b*, 53*c*, 53*d* and past the posts. The beam 63 is fastened to the posts 53*a* and 53*b*, and the beam 65 is fastened to the posts 53*c* and 53*d*. The beams 63 and 65 extend transverse to the table 5 and are located well above it. Cross members 67 and 69 can join the beams 63, 65 at their ends.

Figure 5:
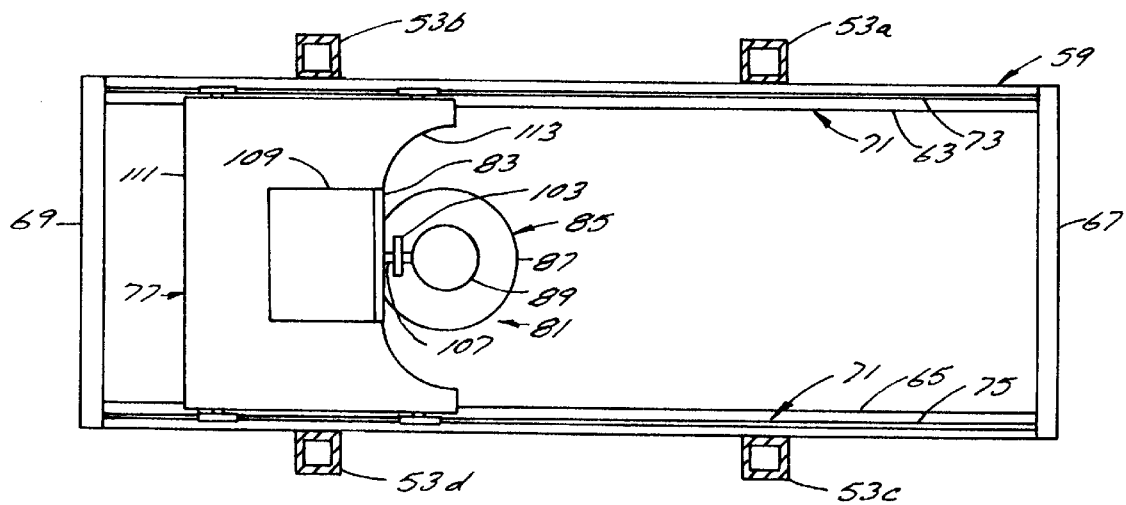
FIG. 5 is a cross-sectional view of the machine, with the saw blade in a horizontal position, taken along line 5—5 in Fig. 1.

The top sub-frame 59 carries one or more tool heads. To this end, carriage guide means 71 are provided on the beams 63, 65 of the top sub-frame. The carriage guide means 71, as shown in FIGS. 2 and 5, can comprise tracks 73, 75 extending along the center of the top surfaces of the beams 63, 65 respectively. A carriage 77 is mounted for movement on the tracks 73, 75. The carriage 77 can move between the ends of the beams 63, 65 in a direction transverse to the longitudinal axis 79 of the table 5. Suitable moving means (not shown) are provided for moving the carriage 77 along the tracks 73, 75. The moving means could be hydraulically, electrically or mechanically operated.

Figure 6:
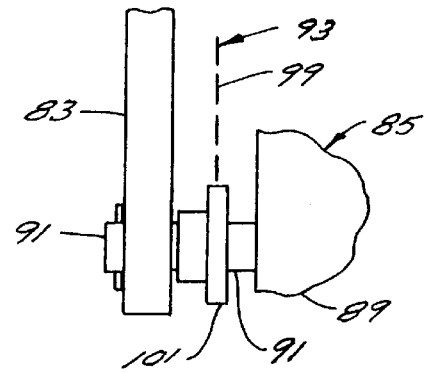
FIG. 6 is a detail view of the mounting of the saw head.

A tool head 81 is suspended from the carriage 77. The tool head 81, as shown in FIGS. 1, 2 and 6, is a saw head and has a base member 83 extending down from the front of the carriage 77. A tool unit 85, consisting of a circular saw blade 87 and a motor 89 for the saw blade 87, is fixed on an axle 91 which is rotatably mounted at the bottom of the base member 83 for rotation about a horizontal axis. The tool unit 85 can be tilted by tilting means 93 rotating the axle 91 it is fixed on, the tool unit movable 180° between any position from a position where the saw blade 87 is vertical on the left of the motor to a position where the saw blade 87 is vertical on the right of the motor. The tilting means 93 can comprise a chain drive having a chain 99 extending between sprockets 101 and 103. Sprocket 101 is fixedly mounted on the axle 91. Sprocket 103 is mounted on the output shaft 107 of a chain drive motor 109 mounted on the floor 111 of the carriage 77. The floor 111 of the carriage 77 can be cut away at the front, as shown by cutout 113 in FIG. 5, to allow the chain 99 to extend between the sprockets 101 and 103. Operation of the chain drive motor 109 will position the saw blade 87 at the proper angle for the desired cut. The tool unit 85 is generally centered within the frame 51, above the work station WS, with its axis of rotation located in a centrally located, vertical datum line VDL in the frame. The saw blade 87 can be tilted to the left or to the right of the datum line. When the blade is said to be tilted to the right, it is meant that the top of the blade is to the right of the VDL when facing the machine as shown in FIG. 1. While one form of tilting means 93 has been described, other forms could be used.

Figure 7:
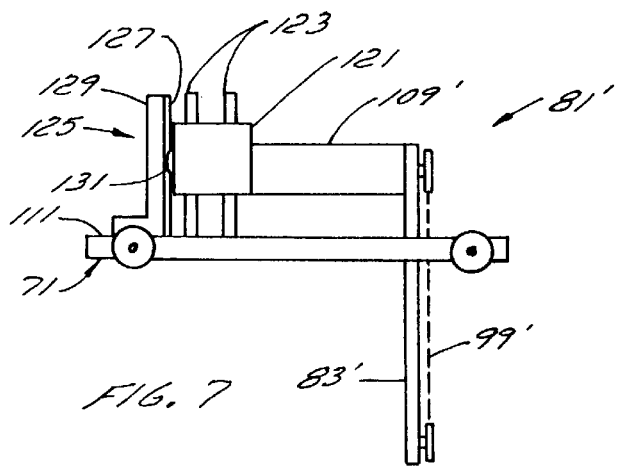
FIG. 7 is a side view of a saw head that is vertically adjustable.

In the embodiment just described, the tool head 81 is located at a fixed height relative to the support bed 3 and to the work station WS. However, in a preferred embodiment, the tool head 81' can be mounted on the carriage 77 so that its height above the work station WS can be varied. To this end the base member 83' and chain drive motor 109' are mounted on a sliding member 121 on the top of the carriage 77 as shown in FIG. 7. The base member 83' along with the chain 99' extend down through the cutout 113 in the floor 111 of the carriage 77. The sliding member 121 is slidably mounted on vertical guide rods 123 fixed to the floor 111 of the carriage 77. Suitable moving means 125 such as a rack and pinion drive with the rack 127 mounted vertically on a support 129 fixed to the floor 111 of the carriage and the pinion 131 mounted on the sliding member 121 and operated by a drive motor (not shown) within the sliding member 121, move the sliding member 121 up or down on the vertical guide rods 123 thus adjusting the vertical position of the saw blade. Other forms of moving means 125 could be used.

The bottom sub-frame 61, forming part of the frame 51, has a pair of parallel beams 133, 135. Beam 133 is fixed to posts 53*a*, 53*c* and beam 135 is fixed to posts 53*b*, 53*d*. Cross members 137, 139 can join the beams 133, 135 at their ends.

Figure 8:
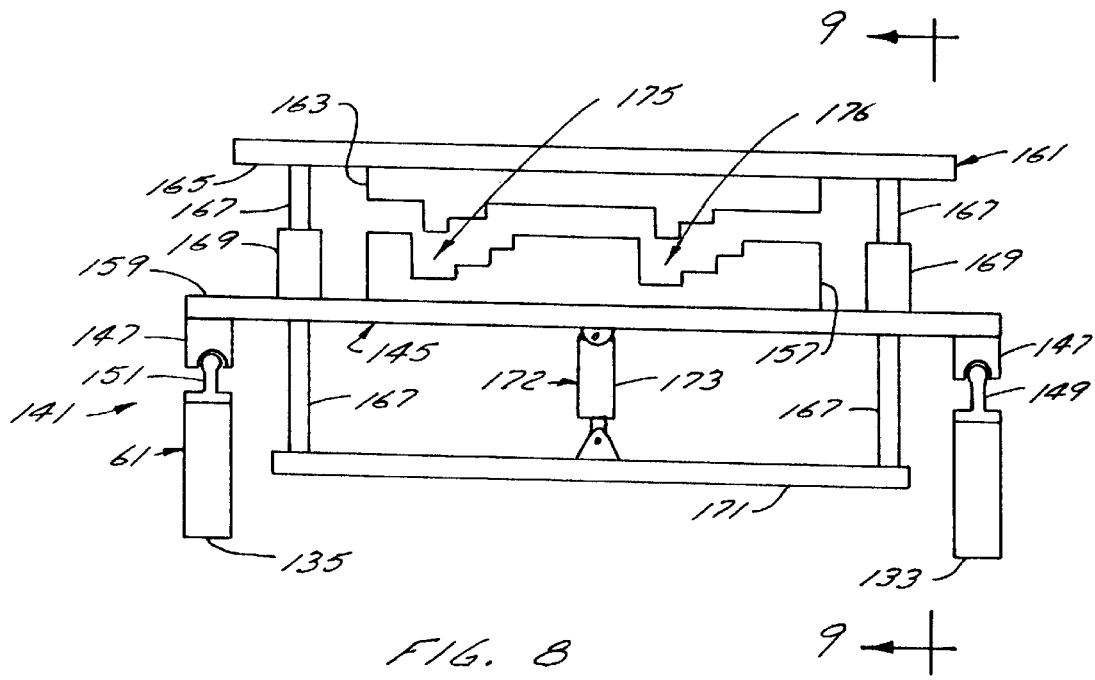
FIG. 8 is a detail side view of a clamp unit in the machine.

Clamping means are mounted on the bottom sub-frame 61 for clamping a profile P moved into the work station WS within the frame 51 from the support bed 3. The clamping means preferably comprises two clamp units 141, 143, one on each side of the work station WS and on each side of the tool head 81 as shown in FIG. 1. Each clamp unit 141, 143 is the same so only one will be described in detail. The clamp unit 141, as shown in FIGS. 8 and 9, has a base plate 145 extending transversely across the frame and slidably mounted, by slides 147, on longitudinal guide means such as a pair of horizontal, parallel, guide rails 149, 151. The guide rails 149, 151 are fixedly mounted on beams 133, 135 respectively. The base plate 145 of the clamp unit 141 carries a horizontal, bottom clamping block 157 on its top surface 159. A top plate 161 is mounted above the base plate 145. The top plate 161 carries a top clamping block 163 on its bottom surface 165 facing the bottom clamping block 157. The top plate 161 is parallel to the base plate 145 and is mounted by vertical guide posts 167 to the base plate 145, the posts 167 passing through guide tubes 169 on the base plate and through the base plate. The bottom ends of the guide posts 167 are fixed to a clamping plate 171 mounted below, and parallel, to the base plate 145. Suitable moving means 172, such as a hydraulic cylinder 173, connected between the clamping plate 171 and the base plate 145, move the top plate 161 toward or away from the base plate 145. The cylinder 173 is shown in the center of the top clamping plate 171. A pair of cylinders could be employed instead, one on each side of the clamping plate 171. Moving means other than one or two hydraulic cylinders could also be employed.

The clamp unit shown in FIGS. 8 and 9 is shown with one set of clamp blocks 157, 161 the blocks having two profile receiving areas 175, 176 so as to be able to clamp two profiles simultaneously. The machine, using these clamp units would have a wider support table and two sets of guide wheels on the support table for guiding two profiles. A profile moving means for each profile would be provided on the support table. The frame 51 would also be deeper and the top sub-frame 59 longer to allow the tool head to work on both profiles. The clamp units could be adapted to handle two wide profiles or three or more narrower profiles in the same space merely by using different clamping blocks 157, 163. Each clamp unit can also comprise more than one set of clamp blocks if desired. A machine, as shown in FIG. 1, working on a single profile at a time, would employ clamp units having only single clamp blocks with a single profile receiving area.

Each clamp unit is initially wide open with the top plate 161 as far above the base plate 145 as it will go so as to be ready to receive a profile. The first clamp unit 141 clamps the leading end of profiles P that are moved by the profile moving means 21 into the work station. While the profiles are clamped, the saw head is operated to cut leading end LE of each profile. After this first cut, the clamp unit 141 is opened and the profile moving means move the profiles into the second clamp unit 143. Both clamp units are then clamped and the saw head is again operated to cut each profile P into two elements-a profile piece PP and a separate profile remainder PR as shown in FIG. 9. Clamp unit 141 clamps the profile remainders PR while clamp unit 143 clamps the profile pieces PP. The profile moving means 21 remains clamped to the profiles P during cutting and to the profile remainders PR after cutting.

Connecting means 177 are provided between the clamp units 141, 143 so that movement of the clamp unit 141 closest to the support bed 3 will cause movement of the clamp unit 143 on the other side of the work station WS. In one embodiment, as shown schematically in FIG. 10, the connecting means 177 can comprise two horizontal, rigid, connecting bars 183 (only one shown), parallel to the guide rails, (guide rail 149 the only one shown) and adjacent to them, the bars 183 joining the slides 147 of the two clamp units. The connecting bars 183 will allow the two clamp units 141, 143 to move as a single entity in either direction along the guide rails 149, 151. The clamp units 141, 143 move when the first clamp unit 141 is moved by the profile moving means 21, through the profile remainder PR element which is still gripped between the profile moving means 21 and the first clamp unit 141 as will be described. This connecting means 177, using the rigid bars 183, is particularly suitable for positioning either adjacent cut end 185, 187 of the two adjacent profile elements-profile piece PR and profile remainder PR-held by the clamp units 141, 143, relative to the datum line VDL and the tool head overhead, so that the positioned cut end can be worked on as will be described.

Figure 11:
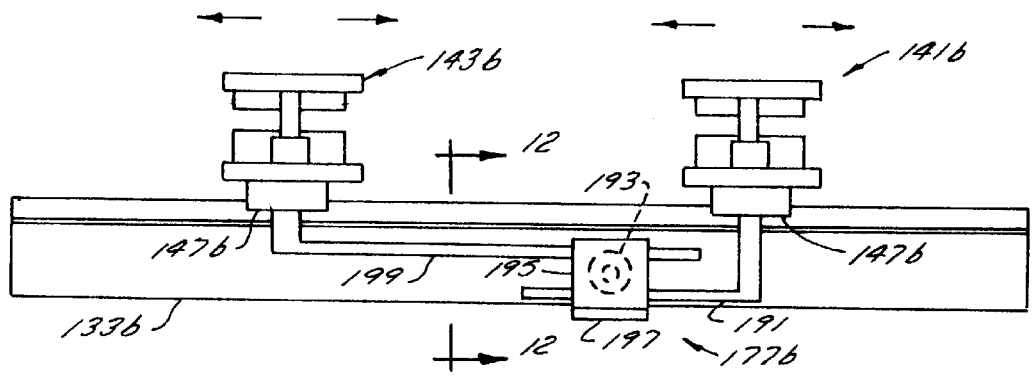
FIG. 11 is a detail side view showing another form of connecting means for connecting the clamp units.
Figure 12:
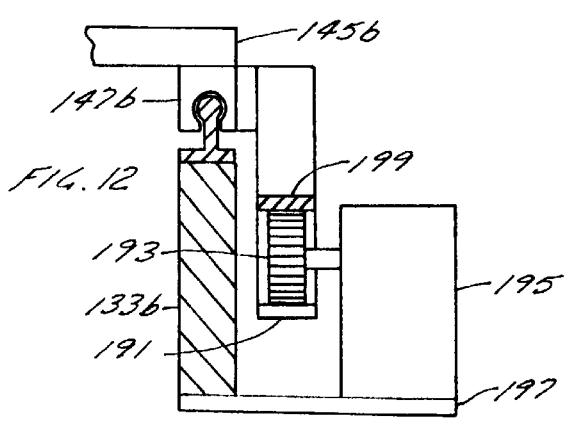
FIG. 12 is a detail cross-sectional view taken along line 12—12 in FIG. 11.

The connecting means 177b, in another embodiment, can comprise clamp centering means for use in moving the clamp units 141b, 143b in unison toward or away from each other and toward or away from the vertical datum line VDL. To this end the clamp centering means can comprise a rack and pinion arrangement. A first rack 191, as shown schematically in FIGS. 11 and 12, is fixed at one end to the slider 147b of one clamp unit 141b, and extends horizontally to the bottom of a pinion gear 193 which gear is mounted on a housing 195 for rotation about a horizontal axis. The housing 195 is located between the clamp units 141b, 143b and is mounted on the cross beam 153b by a bracket 197. A second rack 199 is fixed at one end to the slider 147b of the other clamp unit 143b and extends horizontally to the top of the pinion gear 193. Movement of the clamp unit 141b by the profile moving means 21, through the profile remainder PR, will, through the rack 191, the pinion gear 193, and the second rack 199, move the second clamp unit 143b which still clamps the profile piece PP. The clamp units 141b, 143b move in unison toward or away from each other the same amount depending on which direction the profile moving means 21 moves. The clamp units 141b, 143b move transversely relative to the vertical datum line VDL which datum line passes through the axis of rotation of the saw head. This connecting means 177b is particularly suitable for positioning both cut ends 185, 187 of the two profile elements held by the clamps the same distance from the datum line VDL so that both ends can be worked on simultaneously by an overhead tool, centered on the datum line, as will be described.

Figure 13:
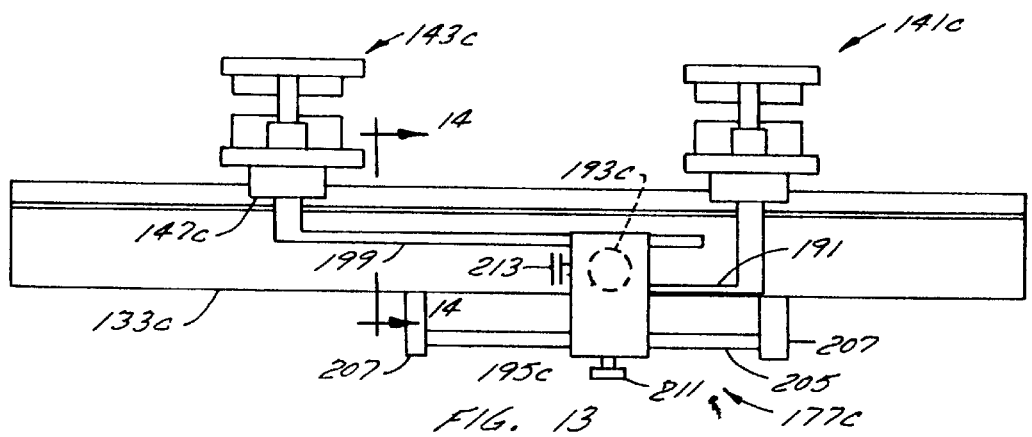
FIG. 13 is a detail side view of the preferred form of connecting means for connecting the clamp units.
Figure 14:
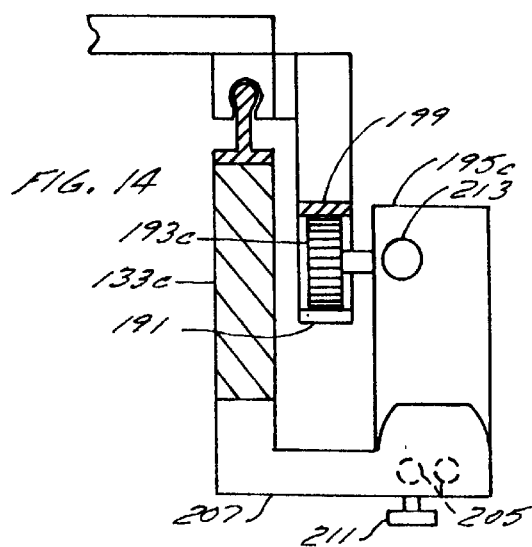
FIG. 14 is a detail cross-sectional view taken along line 14—14 in FIG. 13.

In a preferred embodiment of the invention, as shown schematically in FIGS. 13 and 14, the clamp connecting means 177c has the housing 195c carrying the pinion gear 193c itself mounted for horizontal movement. The housing 195c is slidably mounted on a pair of secondary guide rails 205 located beneath the cross beam 153c, the secondary rails 205 being fixed to the cross beam 153c by brackets 207. In operation, the housing 195c can be locked in position on the secondary rails 205 by suitable locking means 211. Operation of the profile moving means 21 will move the first clamp unit 141c, through the clamped profile remainder PF. Movement of the first clamp unit 141c will, through the first rack 191c, the pinion gear 193c, and the second rack 195c, move the second clamp unit 143c holding the profile piece PP. The clamp units move toward or away from each as before. Alternatively, the housing 195c can be unlocked from the secondary rails 205 by loosening the locking means 211 and the pinion 193c can be locked by suitable pinion locking means 213. This provides a rigid, fixed length, connection between the clamp units 141c, 143c allowing the clamp units to move as a single entity in one direction or the other, the clamp units 141c, 143c remaining the same distance apart, when the profile moving means 21 moves the first clamp unit 141c. This clamp connecting means 177c is selective and allows either end 185 or 187 of the profile elements to be worked by an over head tool or it allows both ends of the profile elements to be worked on simultaneously as will be described.

Means are provided adjacent the main frame 51, on the side opposite from the side where the support bed 3 is, for unloading profiles pieces PP from the main frame 51. As shown in FIG. 1, the unloading means 215 can comprise an unloader 217 slidable on a pair of tracks 219 which tracks extend horizontally outward from the main frame 51. The tracks 219 are mounted on a secondary frame 221 adjacent the main frame 51. The unloader 217 carries clamp means 223 for clamping the leading ends of the profile pieces. Movement of the unloader 217 toward from the main frame 51 on the tracks 219 by suitable moving means (not shown), allows the profile pieces in the work station WS to be clamped by the clamp means 223. Then, movement of the unloader 217 away from the main frame 51 draws the profile pieces by their leading end out of the work station area WS within the main frame 51. Release of the pieces outside the main frame allows the finished pieces to drop into a bin within the secondary frame 221.

Figures 15A, 15B:
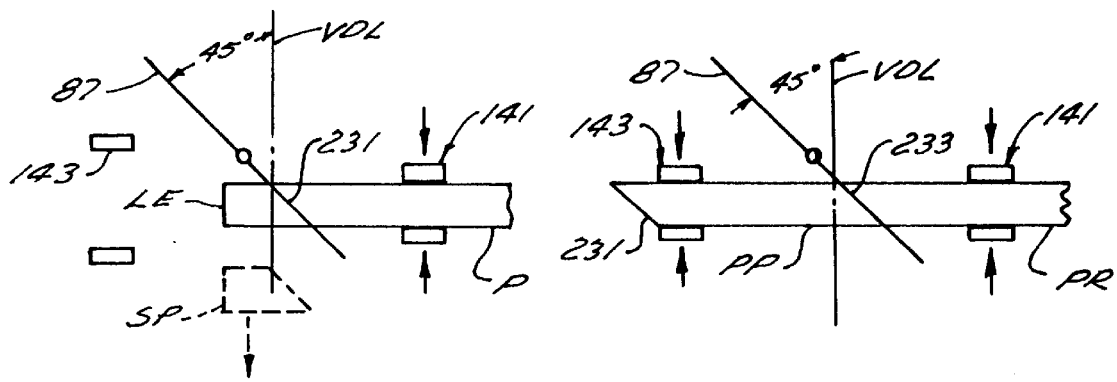
FIGS. 15A, 15B and 15C are schematic views showing how the machine can provide profile pieces with miter cut ends.
Figures 15C, 15D:
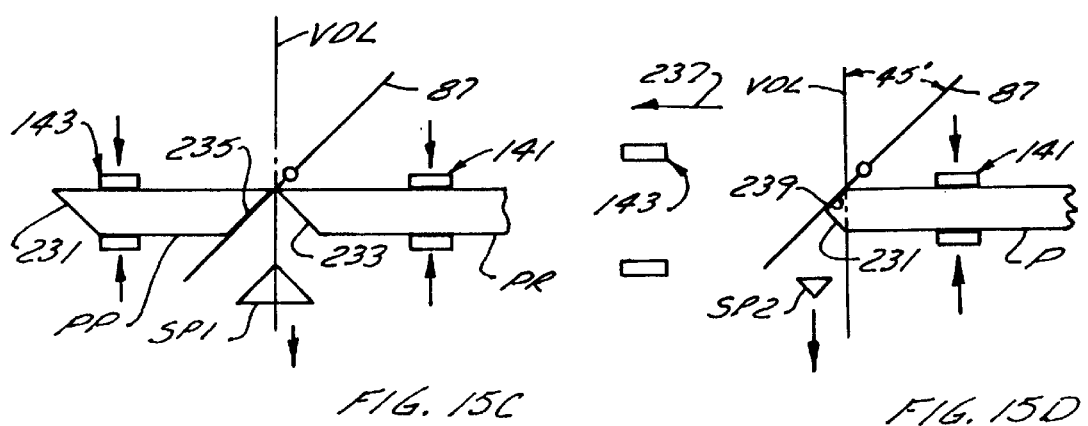
FIGS. 15D, 15E and 15F are schematic views showing how the machine can provide profile pieces with mullion cut ends.

Operation of one embodiment of the machine will now be described. The machine, in this one embodiment, works on a single profile and has one tool head overhead, which tool head is a saw head, and employs the third clamp connecting means 177c (shown in FIG. 13) with the brake 211 unlocked and the brake 213 locked. With the connecting means 177c in this set-up, the clamp units 141, 143 move together as a fixed unit. A profile P, such as an elongated piece of aluminum extrusion, is placed on the guide wheels on the support bed 3 and the trailing end TE of the profile P is gripped by the jaws 45 on the profile moving means 21. The profile moving means 21 is then operated to move the leading end LE of the profile P, on the guide wheels 11, through the open clamp unit 141 adjacent the support bed 3 and into the work station WS within the main frame 51 with the leading end LE of the profile P located just past the vertical datum line VDL in the machine as shown in FIG. 1. The clamp unit 141 adjacent the support bed 3 is operated to clamp the profile P adjacent its leading end LE. The saw blade 87 in the tool head 81 is tilted to be at an angle of 45° left by the chain drive 97 and the saw motor 89 is then operated and the carriage 77 moved to have the saw 87 make a first cut, cutting the profile P adjacent its leading end LE at a 45° cut 231 as shown in FIG. 15A. The cut-off scrap piece SP drops down into a bin (not shown) positioned within the bottom of the frame 51 under the work station WS. Since there is nothing under the work station WS, the collection of scrap pieces cut off the profile elements is easily carried out. The profile moving means 21 continues to grip the profile P. The carriage 77 is moved back, the left clamp unit 141 is unclamped, and the profile moving means 21 moves the profile P through the left clamp unit 141 and the frame an amount equal to the required length of the first profile piece PP. Both clamp units 141, 143 are now operated to clamp the profile on either side of the datum line VDL and the carriage is moved again to make a second cut 233, cutting through the profile at the datum line VDL, at an angle of 45° left as shown in FIG. 15B. The carriage is moved back, the saw blade 87 is tilted to a position 45° right and the carriage is moved forward to make a third cut 235, as shown in FIG. 15C, cutting through the profile P a second time at the datum line at an angle of 45° right. The second cut has separated a profile piece PP from the remainder of the profile PR but this separate profile piece PP is still clamped by the clamp unit 143. The second scrap piece SP1, cut off by the second and third cuts, drops down into the scrap bin. The separate profile piece PP can be moved to the left by operating the profile moving means 21 to move the clamp unit 141 the left, through its connection via the profile remainder PR, the clamp unit 141 simultaneously moving the clamp unit 143, holding the profile piece PP, through the connecting means 179c. The clamp unit 143 is then unclamped and the unloader 217 is moved to clamp the leading end of the profile piece PP and withdraw it from the frame before releasing it to drop it into a bin. The remainder of the profile PR is then positioned to be cut twice again by the single saw head thus producing another profile piece with 45° angled ends.

Figure 15E:
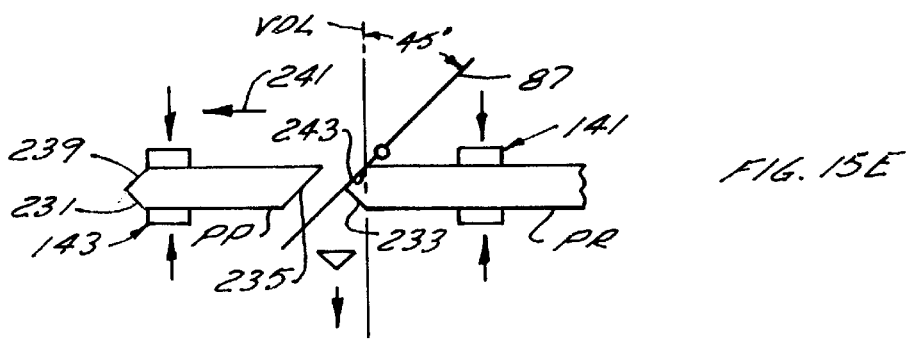
Figure 15F:
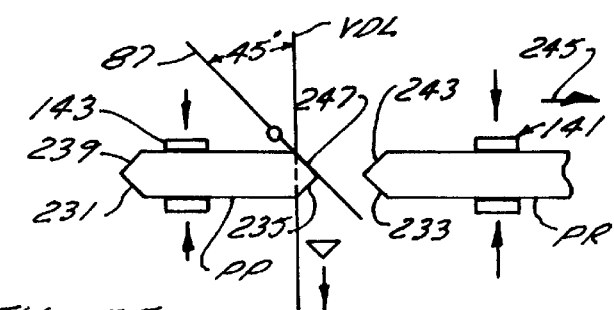

The machine is versatile. If desired, mullion cuts can be made on the profile pieces being produced from the profile. To this end, after the first cut 231 is made, as shown in FIG. 15A, and the carriage is moved back, the two clamp units 141, 143 are moved in unison, via the profile moving means 21 and the clamp connecting means 179c to move the profile P to the left, as shown by arrow 237, a required distance past the datum line VDL and a 45° right cut 239 is made on the leading end of the profile P as shown in FIG. 15D. This cut produces a pointed mullion end on the profile P with the scrap piece SP2 falling down into the scrap bin. The profile P is then moved the required distance and cuts as shown in FIGS. 15B and 15C are made. The saw 87 is then moved back, the clamp units 141, 143 are moved in unison, via the profile moving means 21 and the clamp connecting means 179c, to the left a required distance past the datum line VDL as shown by the arrow 241, and a second 45° right cut 243 is made on the remainder of the profile PR as shown in FIG. 15E. This operation produces a mullion end on the remainder of the profile PR. The clamp units are moved again, to the right, as shown by arrow 245, to reposition the profile piece PP, the saw is tilted to the left 45°, and another cut 247 is made on the rear end of the profile piece PP to produce a pointed mullion end as shown in FIG. 15F. The mullion cut profile piece PP is then removed from the machine and the remainder of the profile PR is moved to the left by the profile moving means into position where the operation is repeated to cut another short profile piece off with mullion ends. While one method for making mullion cuts has been described, other methods can be used.

It will be seen that the profile moving means 21, the clamp connecting means 179c, and the clamp units 141, 143, together, form positioning means for use in positioning the profile piece PP in the work station WS. The positioning means, to be operative, requires the profile remainder PR to be clamped between the first clamp unit 141 and the profile moving means 21. The profile piece PP, even though it is separate from the profile remainder PR, can be moved back and forth in the work station by the positioning means to have other operations performed on it.

Figure 15G:
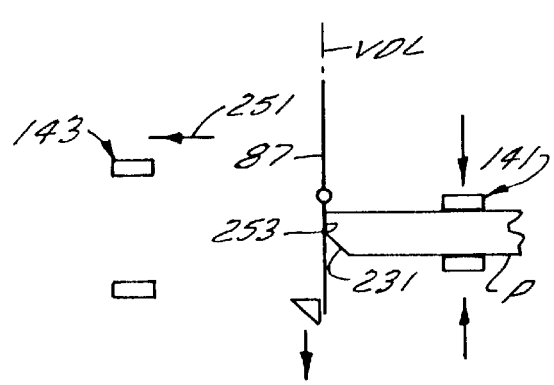
FIGS. 15G, 15H and 15I are schematic views showing how the machine can provide profile pieces with ends that are part miter cut and part straight cut.
Figure 15H:
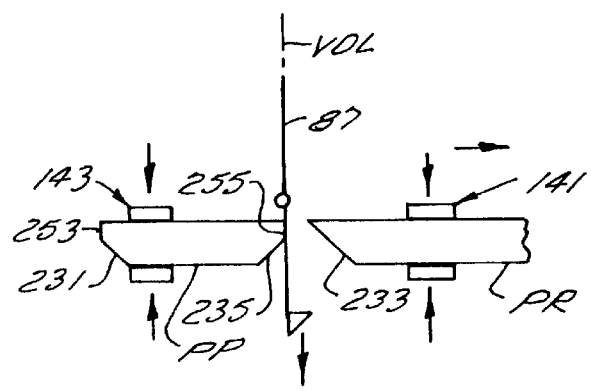
Figure 15I:
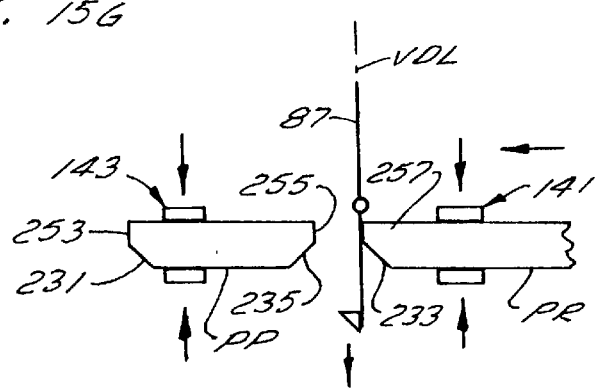

The profile pieces can be cut to have ends with other shapes. For example, they may have ends that are part 45° and part right-angled. For profile pieces with these ends, the first 45° cut is made as before as shown in FIG. 15A. The saw blade 87 is then moved to a vertical position and the profile P is moved to the right as shown by the arrow 251 in FIG. 15G to position the angle cut end 231 at the required position relative to the blade. The blade 87 is then moved forward to make a straight cut 253 cutting off a tip of the profile. The profile P and blade 87 are then moved to make the angle cuts 233, 235 shown in FIGS. 15B and 15C that cut off the profile piece PP. The blade 87 is then moved to a vertical position, and both the profile piece PP and the remainder of the profile PR are moved in unison by the profile moving means 21 and the connecting means 179c to positions where straight cuts 255 and 257 on the adjacent ends of the profile elements PP and PR, as shown in FIGS. 15H and 15I, produce ends that are part mitered and part straight. While 45° cuts have been described, the ends of the profile elements PP and PR could be cut at other angles as well.

Figure 16A:
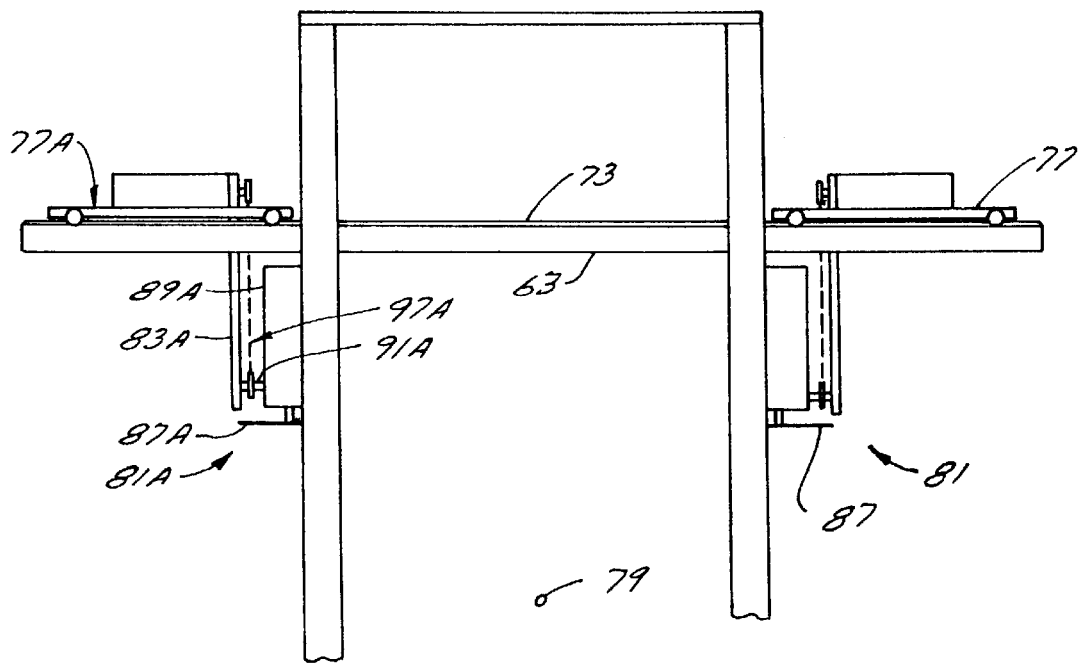
FIGS. 16A and 16B are side views of a machine having two tool heads on the same tracks.
Figure 16B:
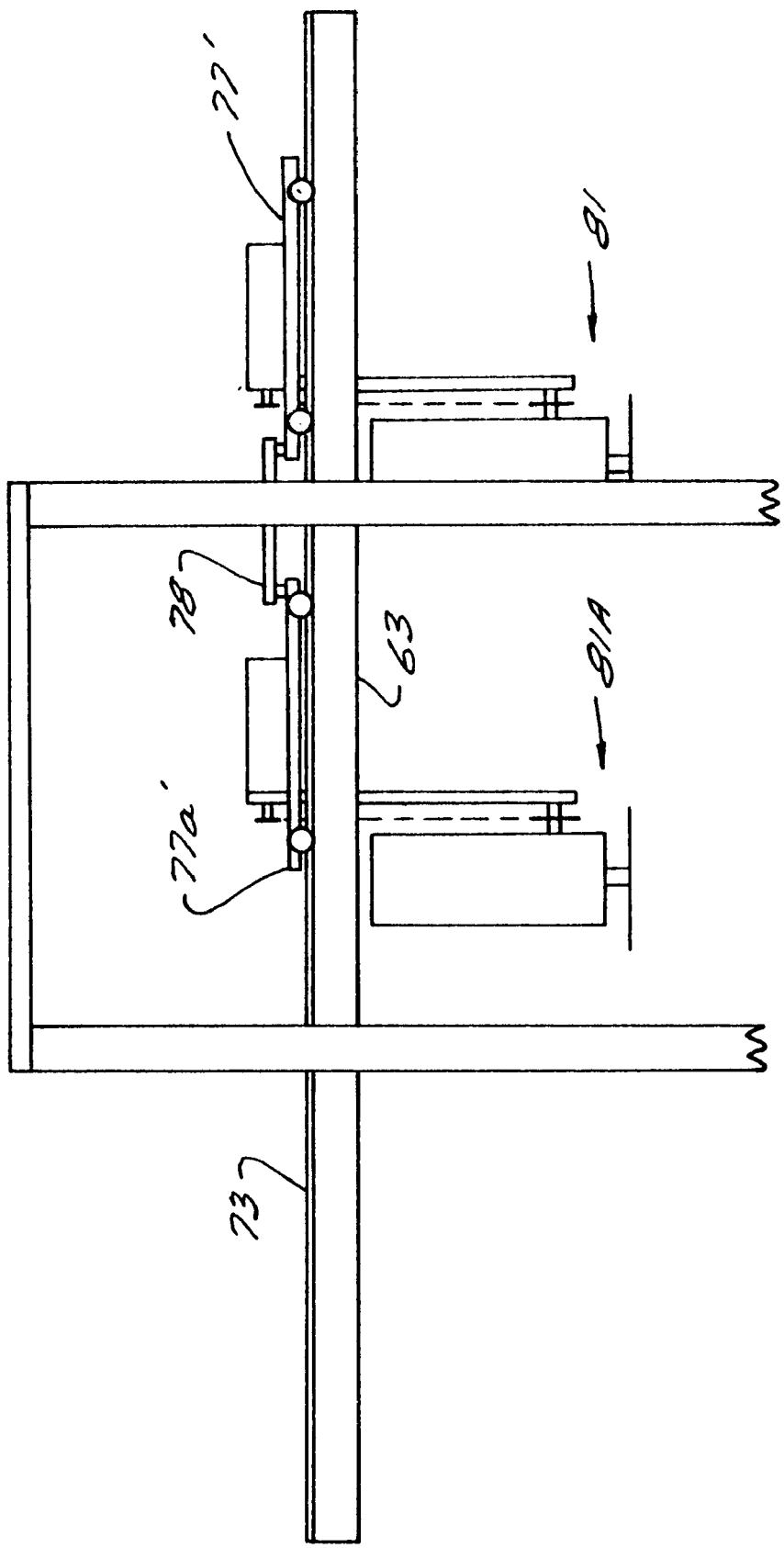

Preferably, to increase production, the machine is provided with a second tool head mounted on the mounting means on the main frame. The second tool head 81a is suspended from a second carriage 77*a*. The second carriage 77*a* can differ from the first carriage 77 or be the same as it depending on the type of tool head that it carries. The second carriage 77*a* is also mounted for movement on the tracks (track 73 only is shown) as shown schematically in FIG. 16A. The second carriage 77*a* is normally located at the end of the tracks opposite to the end of the tracks where the first carriage 77 is located. The second carriage 77*a*, like the first carriage 77, moves along the tracks on the beams (beam 63 only is shown) in a direction transverse to the longitudinal axis 79 of the support bed 3. Suitable moving means (not shown) are provide for moving the second carriage 77*a* along the tracks independently of the first carriage 77. Alternatively, the second carriage 77*a*' can be rigidly connected, in spaced-apart relation, to the first carriage 77' by suitable, rigid connecting means 78 as shown in FIG. 16B. In this mode, the second carriage 77*a*' would be located in the center of the tracks 73, as shown in FIG. 16A, when the first carriage 77' is at one end of the tracks. Both carriages in this mode can be moved by the moving means (not shown) employed for the first carriage 77.

The second tool head 81a can be substantially the same as the first tool head 81, in this case a saw head, and has a base member 83*a* extending down from the second carriage 77*a*. A tool unit, consisting of a second circular saw 87*a* and a motor 89*a* for the saw, is rotatably mounted at the bottom of the base member 83*a*, on an axle 91*a* for rotation about a horizontal axis. The tool unit can be rotated from a position where the second saw blade 87*a* is horizontal to positions where the second saw blade is vertical or 45° to either side from the vertical. Tilting means 97*a*, identical to the chain drive used on the first saw head 81, are provided to rotate the tool unit.

With a second saw head 81*a*, the operation of the machine is much quicker in cutting special profile pieces. For example to cut profile pieces with 45° ends, the one saw 87 is tilted at 45° left and the other saw 87*a* is tilted at 45° right. The profile is fed into the machine, clamped and a first 45° left cut is made by saw 87 on the profile adjacent its leading end. The clamp is unclamped, the first saw 87 returned to its start position on one side of the frame, and the profile moving means 21 moves the profile to a second position corresponding to desired length of the piece to be cut off. Both clamps are operated, the first saw 87 is moved back and forth to make a second 45° left cut and the second saw 87*a* is then moved back and forth to make a 45° right cut. The second 45° left cut separates a first profile piece PP from the remainder of the profile PR. When both cuts are finished the clamps unclamp, the first profile piece, having both ends angled, is removed and the remainder of the profile is moved up to repeat the process. It will be seen that the process is much quicker with two saws than with one since the angle of the saws need not be changed. The use of two saws also makes it much quicker to cut special ends on the profile pieces, such as mullion ends. The positioning means can be used with the profile remainder PR to move the profile elements back and forth in unison to position them for each saw to make 45° cuts left and right on each end. No adjustment of the saws 87, 87*a* is needed. To make ends with both angle and straight portions, only one of the saws need be moved to a vertical position to make the straight cuts after the angle cuts have been made by both saws.

To make the process with two saws even quicker, the carriages 77, 77*a* carrying the two saw heads 81, 81*a* can be constructed to have the carriage 77 carrying the first saw head 81 detachably connect, by suitable means (not shown), to the second carriage 77*a* carrying the second saw head 81*a* when the first saw head moves across from a start position to make a first cut. The first carriage 77 connects to the second carriage 77*a* after the first cut is made, and as the first carriage 77 moves back to its start position, it pulls the second carriage 77*a* with it to have the second saw head 81*a* make the second cut. After the second saw cut is made, the second carriage 77*a* is released from the first carriage 77 and suitable return means (not shown) returns the second carriage 77*a* to its start position. With the above arrangement, the second saw cut is made before the first saw head has returned to its start position after making the first saw cut.

Figure 17A:
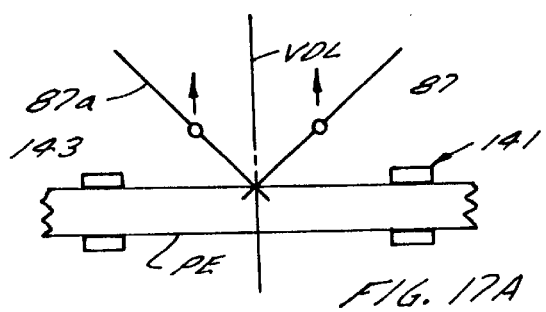
FIGS. 17A, 17B and 17C are schematic views showing how the machine can notch profiles using two saw heads that are vertically adjustable.
Figure 17B:
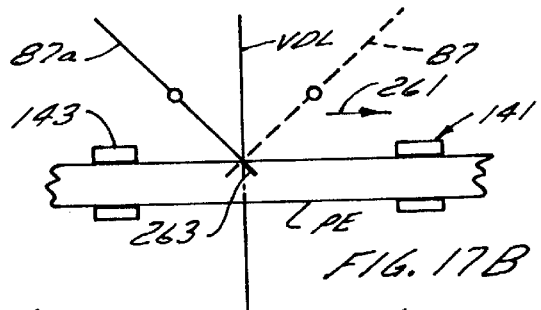
Figure 17C:
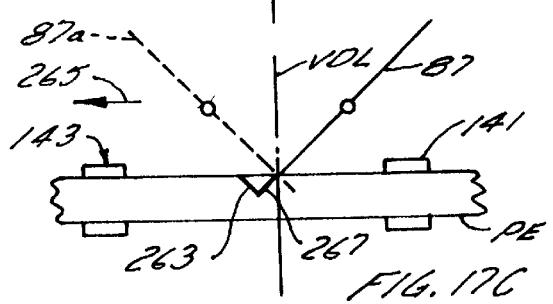

The second saw head 81*a* can also be made adjustable in height in the same manner that saw head 81 is adjustable in height. When both saw heads are adjustable in height, further versatility is obtained with the machine. For example, the saws 87, 87*a* can be adjusted in height to notch a profile element PE held by the clamp units 141, 143. Notching can be done with a machine having one saw head adjustable in height but, again, is more easily done with two saw heads. As shown in FIG. 17A, the saws 87, 87*a* are moved up the required distance to provide a notch of desired depth. Then the profile moving means 21 moves the profile element a required distance to the right, as shown by arrow 261 and saw 87*a*, tilted 45° to the left, makes a first cut 263 as shown in FIG. 17B. The positioning means 247 then moves the profile element PE a required distance to the left, as shown by arrow 265, and the second saw 87, tilted 45° to the right makes a second cut 267, as shown in FIG. 17C, to cut out the notch. The notches can be 90°, as shown, or any other desired angle.

Figure 18:
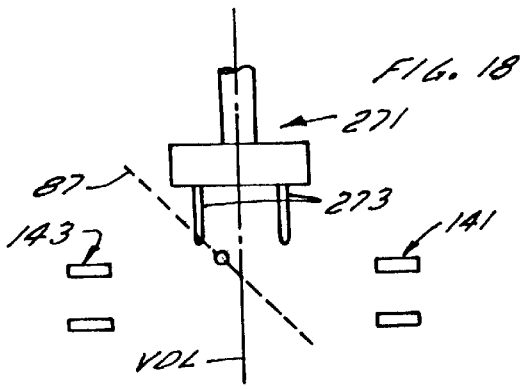
FIGS. 18, 19A, 19B, 20A and 20B are schematic views showing how the machine can miter cut and drill profile pieces using a saw head and a drill head.
Figure 19A:
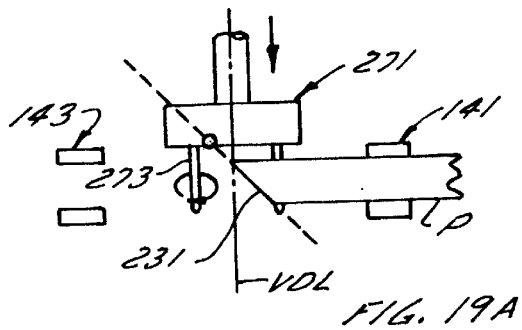
Figure 19B:
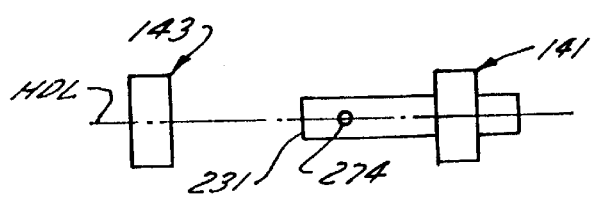
Figure 20A:
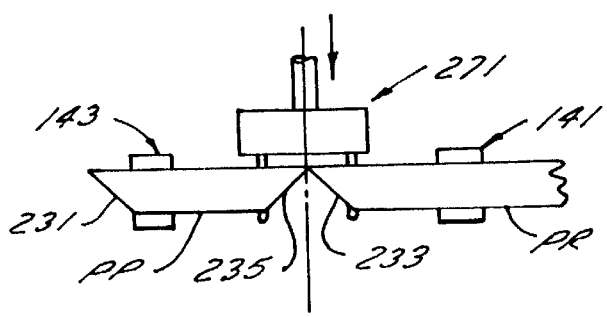
Figure 20B:
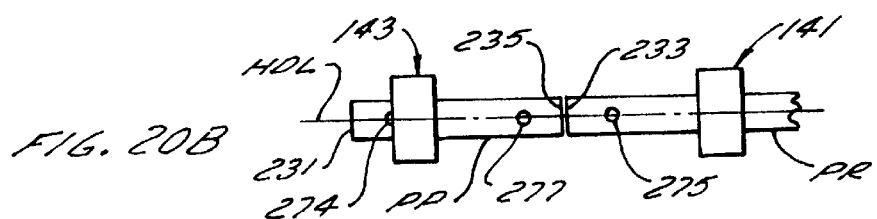
Figure 21:
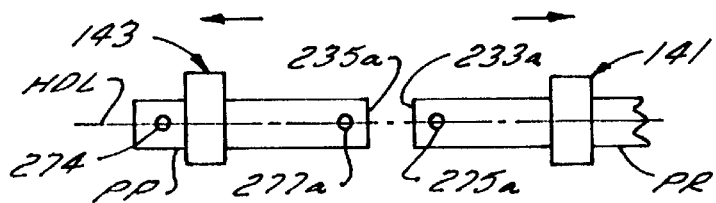
FIGS. 21 and 22 are schematic top views showing the drilling of two holes in each end of a profile element.
Figure 22:
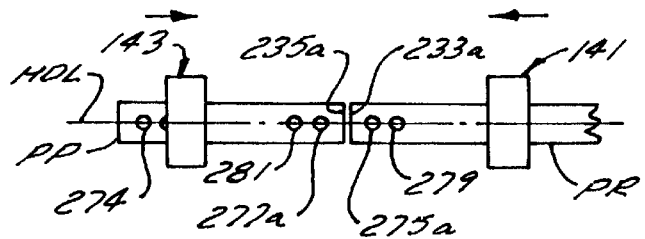

The saw heads 81, 81*a* are preferably detachably mounted on the carriages 77, 77*a*. This allows one to be easily replaced with another type of tool head. For example, one of the saw heads 81*a* can be replaced with a drill head 271 as shown in FIG. 18. The drill head 271 can carry two spaced-apart drills 273. In operation, a profile P is fed into the work station as before. A first 45° left cut 231 is made by the saw 87 on saw head 81 on the leading end of the profile while the profile is clamped by the right clamp unit 141. This cut is shown in FIG. 15A. The saw 87 is then moved out of the way by its carriage and the drill head 271 is moved into position by its carriage and then lowered to drill a hole 274 in the profile adjacent the cut end 231 with one of the drills 273 as shown in FIGS. 19A, 19B. The profile P is then unclamped, moved by the profile moving means 21, and clamped by both clamp units 141, 143. The single saw is then moved, adjusted, and moved again to make a first 45° left cut 233 and a second 45° right cut 235 in the profile. These cuts are shown in FIGS. 15B and 15C and provide two profile elements as before-a separate profile piece PP with both ends mitered at 45° and the leading end of the remainder of the profile PR with a 45° cut. While both profile elements are still clamped, the drill head 271 is now moved to be centered over the profile elements. The drill head 271 is then lowered and operated to drill holes 275, 277 simultaneously in both profile elements a required distance in from each end 233, 235 as shown in FIGS. 20A, 20B. If needed, the profile elements can be positioned in unison, while clamped, by using the positioning means. In this operation, the brake 211 is clamped and the brake 213 is unclamped allowing the cut ends 233, 235 to move in unison the same distance toward or away from the datum line VDL so as to position the drills 273 the required distance in from the ends 233, 235. FIG. 21 shows the holes 275a, 277a drilled into two profile elements moved away from each other so as to position the holes closer to the cut ends 233a, 235a of the elements. If two holes are required in each profile element adjacent each cut end 233, 235, the profile elements, while still clamped, can be moved closer together, in unison, using the positioning means after the first set of holes 275a, 277a have been drilled. The drill head is then again operated and lowered to drill a second set of holes 279, 281, one in each profile element as shown in FIG. 22.

Figure 23A:
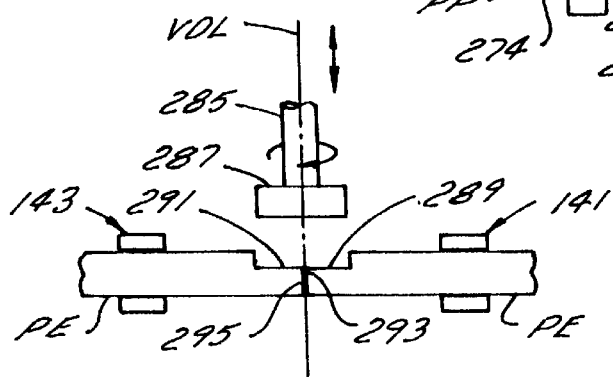
FIGS. 23A and 23B are schematic views showing the use of a router as the second tool.
Figure 23B:
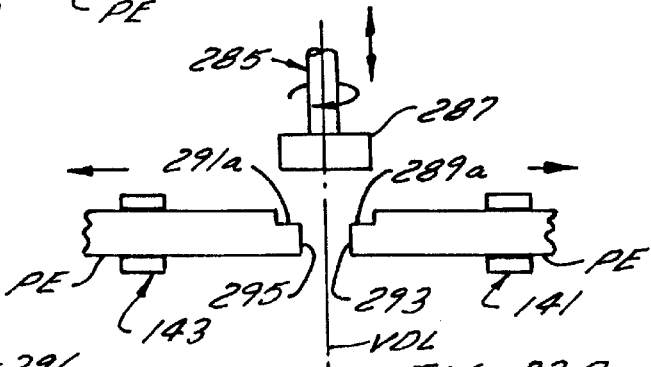

The drill head 271 can be replaced with a router head 285. The router head 285, having a router 287, can be used to simultaneously produce a step 289, 291 in the straight ends 293, 295 of profile elements PE of the desired depth. The router 287 is centered over the profile elements PE and then moved down while operating to cut a step in each end of the facing ends of the profile elements as shown in FIG. 23A. The profile elements PE can be moved away from each other in unison by the positioning means to provide shorter steps 289a, 291a, if desired, as shown in FIG. 23B.

The steps 289, 291 could also be produced by a single saw head if desired. The profile elements and the saw head would be positioned to make a vertical cut in each element a distance in from the ends of the elements to give the length of the step, and a distance down to give the height of the step. The profile elements and the saw head are then repositioned to have the saw make simultaneous, horizontal cuts in the elements, in from their ends, intersecting the vertical cuts.

Figure 24A:
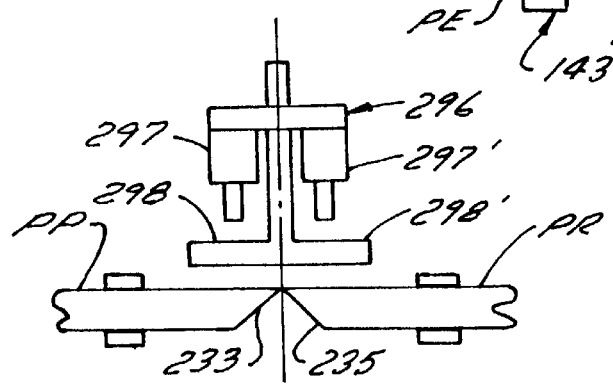
FIGS. 24A to 24E are schematic views showing the use of a double punch as a second tool.
Figure 24B:
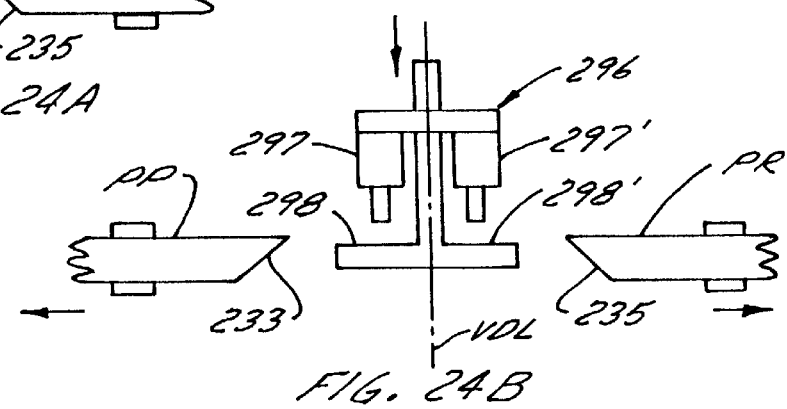
Figure 24C:
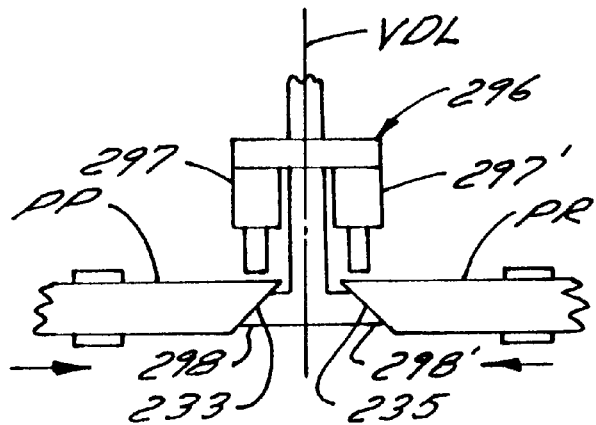
Figure 24D:
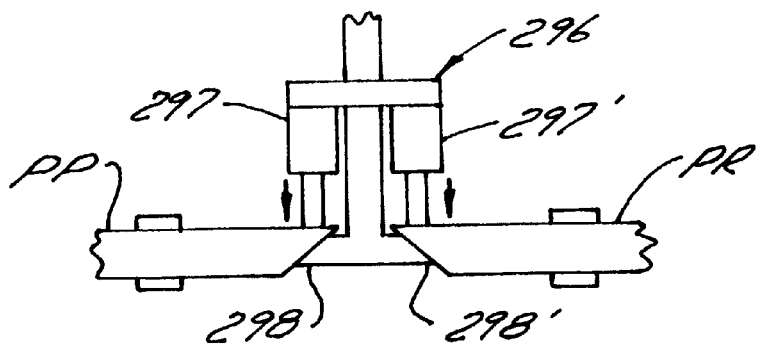
Figure 24E:
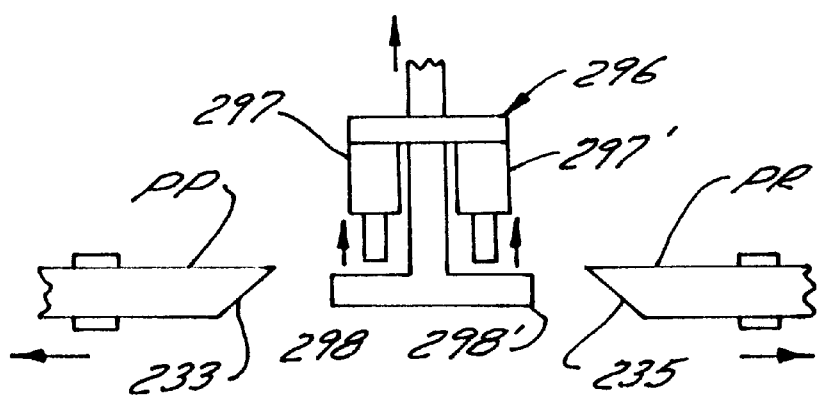

The machine is well suited for carrying out punching operations on profiles. A punching operation provides a quick way to produce a hole, a slot, a notch, or the like in a profile. A punching operation requires an anvil to be positioned beneath the profile area to be punched. In one embodiment, the machine of this invention can have a saw tool head 81 and a punch tool head 296. A profile is initially cut at its leading end and then moved and cut twice again with the saw head 81 to provide two profile elements as before-a separate profile piece PP with both ends mitered and a profile remainder PR with its leading end mitered as shown in FIG. 24A. The saw head 81 is then moved out of the way and the punch head 296 is moved into position. The positioning means, employing the connecting means 177b or 177c, now moves the adjacent ends 233, 235 of the profile elements PP and PR apart from the datum line VDL a distance sufficient to allow double punch tool head 296, carrying two punches 297, 297' and an anvil 298, 298' for each punch, to be lowered between the ends 233, 235 of the profile elements. The punch head 296 is lowered to align the anvils 298, 298' of the punches 297, 297' with the profile elements PP and PR as shown in FIG. 24B. The positioning means now moves the profile elements back toward each other positioning each element PP, PR over an anvil 298, 298', as shown in FIG. 24C. When the profile elements have been moved back to locate them in the proper position, the punches 297, 297' are operated to punch out a hole, slot, notch or the like in the profile elements as shown in FIG. 24D. After punching, the punches are withdrawn and the profile elements are moved apart as shown in FIG. 24E to allow the punch head 296 to be raised.

While the positioning means has been described as including the preferred connecting means 177c, it could also be used with the connecting means 177 or the connecting means 177b in some applications. Neither of these connecting means 177 or 177b however provide a machine with as much versatility as a machine using the connecting means 177c.

Figure 25:
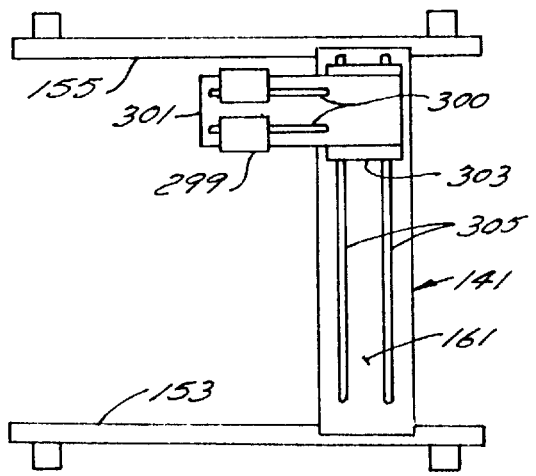
FIG. 25 is a top, schematic, sectional view showing the mounting of a tool head on a clamp unit.

If desired, additional tool heads can be provided on the machine. By way of example, an additional tool head can be mounted on each clamp unit 141, 143 within the main frame. As shown in FIG. 25, a tool head 299 is slidable mounted on rails 300 on a bracket 301. The bracket 301 extends in cantilever fashion from the top of top plate 161 of clamp 141 in toward the work station WS. The bracket is mounted on a carriage 303 running on rails 305 on the top plate 161. Suitable moving means (not shown) are provided for moving the tool head 299 on the rails 300 on the bracket 301 and for moving the bracket 301 on the rails on the top plate 161 so as to be able to adjust the tool head in both the x and y directions relative to a profile clamped in the clamp unit.

Alternatively, the bracket 301 could be omitted and the tool head 299 could be mounted directly on the carriage 303 riding on the rails 305 on the clamp 141. The top plate 161 of the clamp 141 would have a slot (not shown) between the rails 305 giving the tool head 299 access to the work station WS below.

Figure 26:
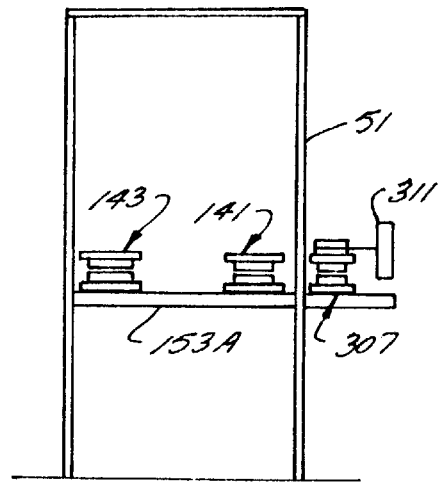
FIG. 26 is a front, schematic, detail view showing the mounting of a clamp unit and a tool on it outside the frame.
Figure 27:
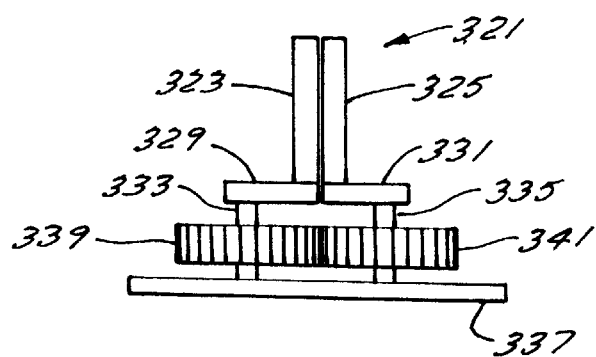
FIG. 27 is a front detail view of a centering guide means.
Figure 28:
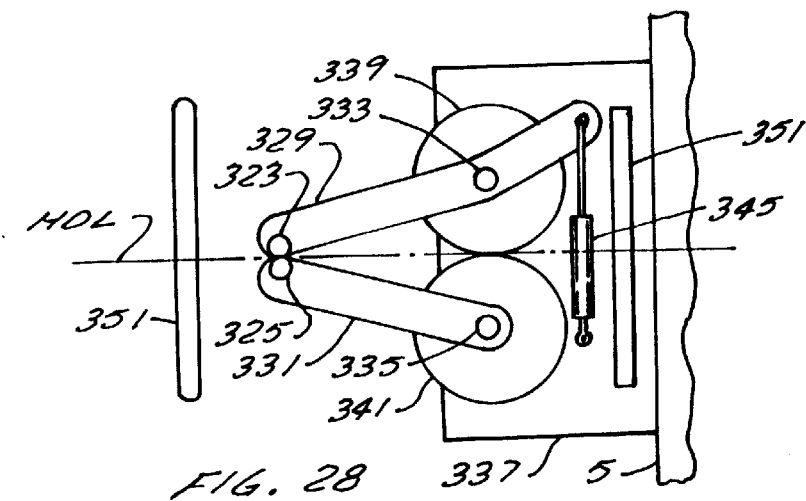
FIG. 28 is a top detail view of the centering guide means at rest.
Figure 29:
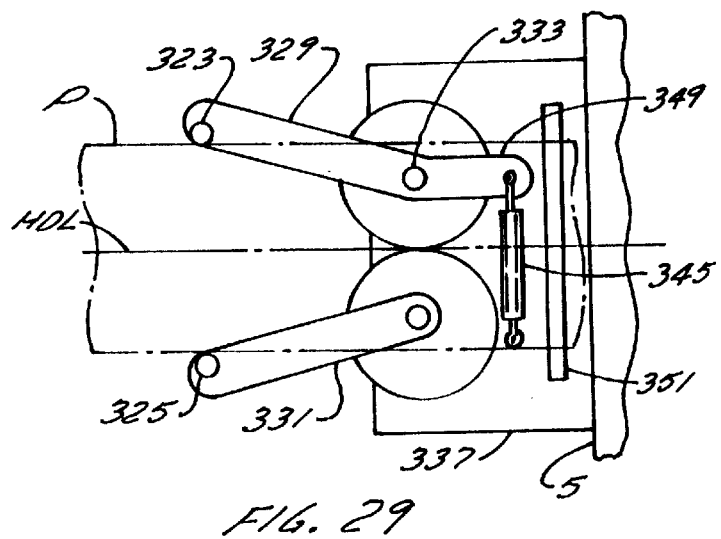
FIG. 29 is a view similar to FIG. 28 but with the guide means in use.
Figure 30:
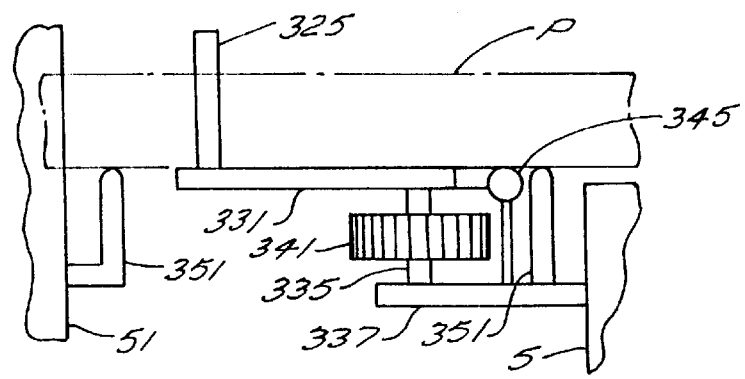
FIG. 30 is a side detail view of the centering guide means in use.

In another embodiment, as shown in FIG. 26, an additional clamp unit 307 could be mounted outside of the frame 51 on the guide rails 309 which are extended to project outside the frame. The additional clamp unit 307 can carry another tool head 311 mounted in the same manner as the tool head 295 shown in FIG. 25 26. This tool head 311 could be cantilevered mounted inwardly toward the datum line, or outwardly, and can do an initial operation on the profile before the profile enters the work station within the frame.

Profiles come in various widths and cross-sectional shapes and not all the profiles being worked on may fit in the guide wheels or the profile guide blocks to be guided accurately. If the fit in the guide means is sloppy, the profiles may not be moved straight along the longitudinal axis 79 or horizontal datum line HDL into the work station WS as required for accurate cuts. To ensure that the profiles are guided accurately, centered along the longitudinal axis 79, or horizontal datum line HDL, a centering guide mechanism is preferably provided at the end of the support bed 3 adjacent the frame 51 for guiding at least those profiles, irregardless of their width, that may have a sloppy fit in the guide means. The centering guide mechanism 321, as shown in FIGS. 27 to 30 comprises a pair of vertical guide fingers or rods 323, 325 spaced apart in a direction transverse to the horizontal datum line HDL. Each guide rod 323, 325 can have a sleeve (not shown) rotatably mounted on it. Each guide rod 323, 325 is mounted on one end of a short arm 329, 331. The other end of each arm 329, 331 is fixedly mounted on a vertical shaft 333, 335. The shafts 333, 335 are parallel and are mounted for rotation in a lateral extension 337 of the table 5 adjacent the frame 51. A gear 339, 341 is fixedly mounted on each shaft 333, 335, just beneath the arms 329, 331 carrying the guide rods 323, 325. The gears 339, 341 are relatively large and smoothly engage each other. Suitable means 345, such as a two-way pneumatic cylinder 347 connected between an extension 349 of arm 329 and table extension 337, bias the arms 329, 331 together. When the arms 329, 331 are biased together, the guide rods 323, 325 contact each other on the horizontal datum line HDL. Movement of one arm 329 away from the horizontal datum line HDL a measured amount in one direction, will, through the gear arrangement, move the other arm 331 the same measured amount in the opposite direction. Thus, no matter how far apart the arms 329, 331, and thus the guide rods 323, 325 are moved, they are always equidistant from the horizontal datum line HDL. Any width of profile P, within reason, can be passed between the guide rods 323, 325 and the rods will always center the profile P on the horizontal datum line HDL. Horizontal guide bars means 351 can be provided, attached respectively to the frame 51 and to the extension 337 of the table 5, to maintain the profile P at the proper height to be guided into the clamp units on the frame.

The guide blocks 157, 163 on the base and top plates 145, 161 respectively of each clamp unit 141, 143 can be profile guide blocks having top and bottom surfaces respectively that can receive several different standard extrusions. The guide blocks are replaceable to be able to accommodate many standard profiles. The guide blocks 157, 163 can be long enough to accommodate two profiles at a time as shown in FIG. 8. Usually the base profile block 157 is fixed and the length of the profile piece being cut off is measured on the top of the profile. This applies whether or not the profile being cut is for an inner frame, or an outer frame in which the inner frame is to snugly fit. Thus, if the length being measured is the outside surface of a profile piece for an inner frame, it is also the outside surface of a profile piece for the outer frame receiving the inner frame. If the height of the profile being measured for the inner profile piece is off just slightly, then the outside surface of the profile piece, adjacent the inside surface of the outer frame profile piece may be slightly longer or shorter than required to match the exact inside length of the outer frame profile piece and the inner frame would not fit as well within the outer frame as it could.

To overcome this problem, a new profile block has been designed that allows the profiles, used for both inner and outer frames that have to fit within one another, to be held and measured along the same horizontal datum line HDL. This allows the inner frame profile piece to be measured along its outside surface and the outer frame profile piece to be measured along its inside surface. With both measurements made along the same data line the pieces are cut more accurately to length, and when assembled, the inner frame fits more accurately within the outer frame.

Figure 31:
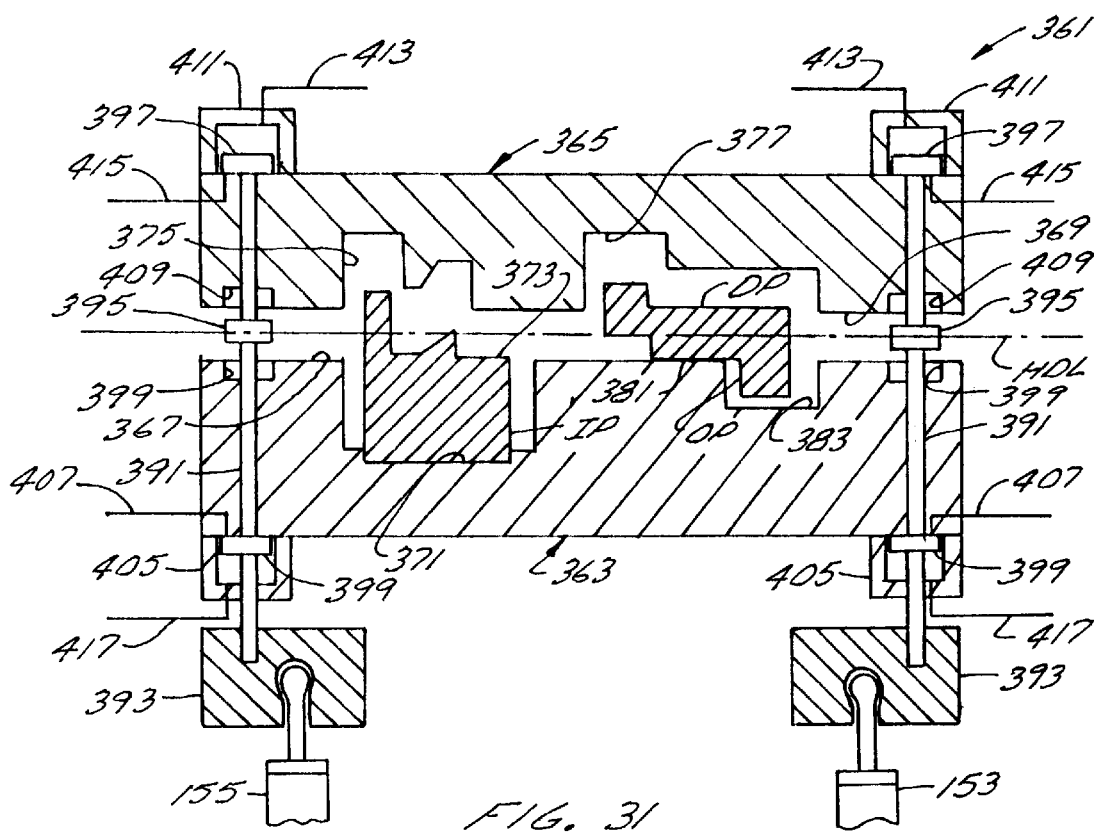
FIG. 31 is a cross-sectional detail view of a novel set of guide blocks in a profile loading position.
Figure 32:
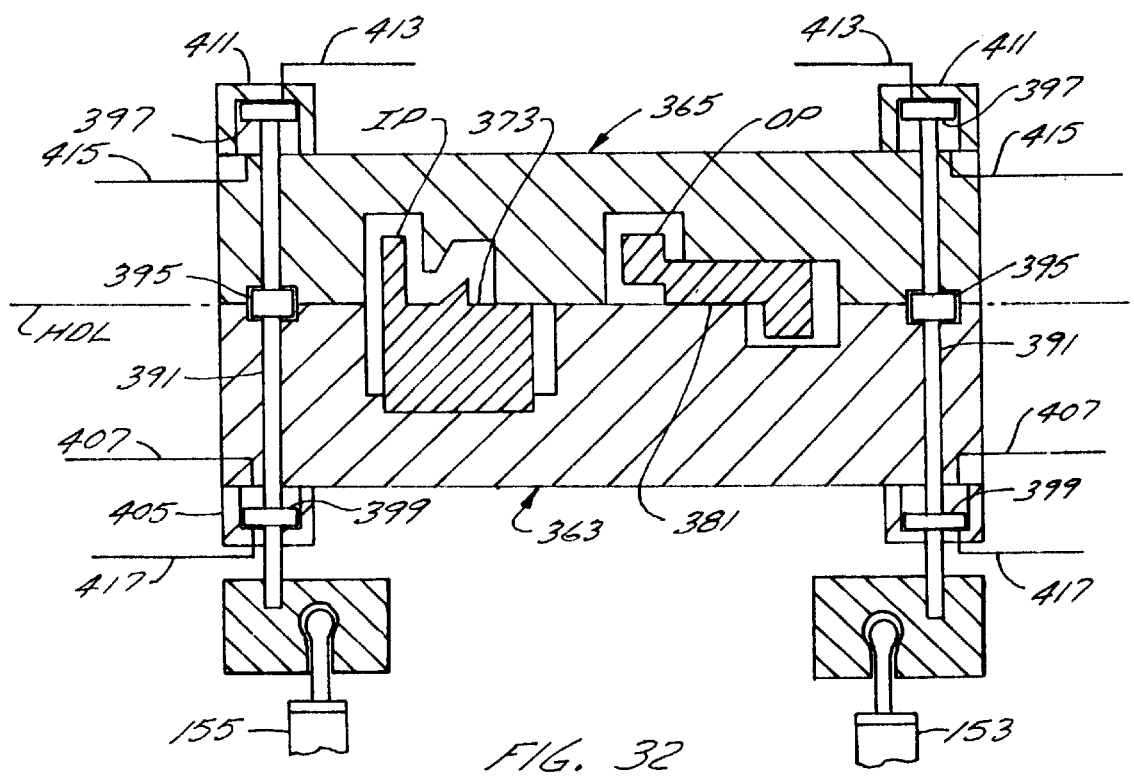
FIG. 32 is a cross-sectional detail view of the guide blocks in use.

The new profile block 361, as shown in FIGS. 31 and 32, has a bottom block 363 and a top block 365. The bottom block 363 has a top surface 367 and the top block 365 has a bottom surface 369. The surfaces 367 and 369 abut on the horizontal datum line HDL when the blocks 363, 365 are moved to abut as will be described. The bottom block 363 has a cutout 371 matching most of the cross-section of the profile IP used to form inner frame profile pieces IFPP. The main outer surface 373 of the inner frame profile piece IFPP that is adjacent to the outer frame profile piece OFPP, when the pieces are assembled in inner frames IF and outer frames OF and mounted one within the other, as shown in FIG. 33, is aligned with the top surface 367 of the bottom block 363. The top block 365 can have a smaller cutout 375 matching the remainder of the cross-section of the profile IP used for the inner frame profile pieces.

Similarly the top block 365 has a cutout 377 matching most of the cross-section of the profile OP used to form the outer frame profile pieces OFPP. The main inner surface 381 of the outer frame profile piece OFPP, that is adjacent to the inner frame profile piece IFPP when the pieces are assembled in inner frames IF and outer frames OF and mounted one within the other, is aligned with the bottom surface 369 of the top block 365 when the blocks abut as shown in FIG. 32. The bottom block 363 can have a smaller cutout 383 for receiving the remainder of the outer frame profile OP.

Means are provided for moving the top and bottom profile blocks 363, 365 toward each other so that they will abut on the horizontal datum line HDL as shown in FIG. 32. The moving means can include two or four fixed vertical guide pins 391 extending up from mounting blocks 393 slidably mounted on the guide rails 153, 155. One or two guide pins are at each end of the profile blocks 363, 365 and each guide pin extends through bores in the profile blocks. Each guide pin 391 has a central stop 395 fixed on it, the central stop 395 located near the center of the pin and centered with respect to the horizontal datum line HDL. Each pin 391 also has a pair of outer stops 397, 399 fixed to it near its outer ends. Stop 397 is at its outer end and stop 399 is adjacent the mounting blocks 393.

The bottom block 363 is mounted for sliding movement on the pins 391. The bottom block 363 has a pair of cutouts 399 in its top surface 367, adjacent its ends and concentric with the bores receiving the guide pins, for receiving the bottom half of the central stop 395. The bottom block 363 also has a pair of small fluid receiving bottom chambers 405 on its bottom surface through which the guide pins 391 pass and in each of which a bottom stop 399 on the guide pin is concentrically located. When the profiles IP and OP are being loaded, the bottom block 363 is dropped down and has its bottom surface resting on top of the bottom stops 399. Fluid is passed into the bottom chambers 405 through lines 407, above the bottom stops 399, to lift the bottom block 363 up against the central stop 395 and thus position the top surface 367 of the bottom block 363 on the horizontal datum line HDL.

The top block 365 also is mounted on the guide pins 391 for sliding movement and has a pair of cutouts 409 in its bottom surface 369 for receiving the top half of the central stops 395. The top block 365 also has a pair of small fluid receiving top chambers 411 into which the guide pins 391 pass and in which the top stop 397 is located. When the profiles IP and OP are being loaded, fluid is provided in the top chambers 411 above the stops 397 through a line 413 to raise the top block 365 to an open position. When the profiles are loaded, fluid is provided in the top chambers 411 beneath the stops 397, through lines 415, to move the top block 365 down against the central stops 395 and thus position the bottom surface 369 of the top block 365 on the horizontal datum line HDL. Thus the profile blocks 363, 365 clamp the profiles IP, OP accurately in position relative to the horizontal datum line so that the profile pieces are of the right length when cut and a proper fit when assembled. To release the profiles, the blocks are separated by passing fluid in the chambers through lines 415 into the top chambers and through lines 417 into the bottom chambers.

To make the manufacture of frame units even more efficient it is contemplated to provide a support table 3" that is wide enough to feed, and a main frame 51" that is deep enough to accommodate, four profiles P1, P2, etc., simultaneously into the work station WS as shown in FIG. 34. A separate profile moving means 21*a*, 21*b*, etc. is provided for moving each profile P1, P2, etc. into and in the work station, the profile moving means moving in gaps or slots (not shown) in the table. Guide wheels or guide blocks are mounted on the table for guiding the four profiles. In the work station, each profile P1, P2, etc. is cut into a profile piece PP1, PP2, etc. The profile pieces PP1, PP2, etc. are then finished in the work station, using suitable tool heads, additional to the cutting head if required, and the positioning means previously described, to form sides 501, 503, 505, 507 of a frame 509 as shown in FIG. 35. The four profile pieces PP1, PP2, etc. cut off the four profiles are of the required length to form a frame 509 of the required size. If the frame 509 is rectangular, as shown, the profiles P1 and P2 could be moved to provide the long sides 501, 503 to be cut off profiles P1 and P2 while the profiles P3 and P4 are moved to provide the short sides 505, 507 to be cut off the profiles P3 and P4. All four sides are cut off with one cut. On the next cut, for the next frame, the short sides 505, 507 could be cut off the profiles P1 and P2 while the long sides 501, 503 are cut off the profiles P3 and P4. The profile moving means 21a, etc. allow the profiles P1, etc. to be moved to be able to cut pieces of different length off adjacent profiles. Preferably, one profile moving means can be provided for each pair of profiles. Thus one profile moving means is provided to move both profiles P1 and P2 simultaneously and a second profile moving means is provided to move both profiles P3 and P4 simultaneously. While the machine has been described to handle four profiles, it could obviously be adapted to handle more or less than four profiles depending on the shape of the frame to be made.

An assembly unit 511 is located adjacent the unloading means 215" of the machine. The unloading means 215" could comprise an unloading unit 217" for each profile or for each pair of profiles as shown. The four cut profile pieces PP1, etc. unloaded off the machine, are assembled into the shape of a frame 509 in the assembly unit 511 and are formed immediately into a frame. No sorting, collecting, moving or storing of the profile pieces is required before they are formed in to a frame.

Many of the operations described above have the profile being fed into the machine and cut into profile pieces with other operations being performed on the profile pieces after cutting. However, for certain operations, the profile could be fed through the machine without cutting but with one or more operations other than cutting being carried out on the profile, such as for example, drilling holes at certain locations on the profile. The profile is then pulled back by the profile moving means and is fed through the machine a second time to be cut into profile pieces with the holes at desired locations in each profile piece.

The machine lends itself to being computer controlled. Once certain parameters have been established, such as the length of the profile or profiles being worked on, the number and types of tool heads and the sizes of the tools, the initial position of the clamp units in the work station, and the type of profile pieces required, the cutting and working of the profile or profiles into profile pieces can be done automatically once started. The operation is much quicker than known machines, and less expensive.

We claim:

1. A method for use in making profile pieces comprising the steps of:

providing a machine with a work station, a pair of clamp units in the work station, the clamp units being slidable and mechanically, operably connected together in a manner to have the movement of one clamp unit result in simultaneous movement of the other clamp unit, and profile moving means outside the work station on one side for feeding a profile into the work station;

holding the profile with the profile moving means;

operating the profile moving means to feed the held profile into the work station to a position where it can be clamped by each clamp unit;

clamping the profile in the work station with both clamp units;

cutting the clamped profile in the work station between the clamp units while held by the clamp units and the profile moving means, into a profile remainder held by one clamp unit and the profile moving means and a profile piece held by the other clamp unit; and while the clamp units remain clamped after clamping, operating the profile moving means to move the held profile remainder and thus the one clamp unit and to simultaneously move the other clamp unit holding the profile piece in preparation for carrying out another operation on the profile piece.

2. A method as claimed in claim 1 wherein the clamp units are operably connected together in a manner to move as a single entity in the same direction with fixed spacing between them.

3. A method as claimed in claim 1 wherein the clamp units are operably connected in a manner to move in unison toward or away from each other.

4. A method as claimed in claim 1 wherein the clamp units are operably connected together to selectively move as a single entity in the same direction or to move in unison toward or away from each other.

5. A method as claimed in claim 1 wherein, while the clamp units are clamping the profile piece and the profile remainder, and before the profile moving means are moved, the clamp units are selected to move in one of the following manners:

the clamp units moving in unison in either direction while maintaining the same distance between them;

the clamp units moving toward each other; and the clamp units moving away from each other.

6. A machine for making profile pieces having:

a work station;

profile moving means outside the work station for holding and feeding a profile into the work station;

spaced apart clamp units at the work station for selectively clamping the profile between them while the profile is still held by the profile moving means, the clamp units being slidable;

saw means at the work station for cutting the held and clamped profile between the clamp units into a profile remainder held by one clamp unit and the profile moving means and a profile piece held by the other clamp unit; and mechanical means operably connecting the clamp units together in a manner to have movement of the one clamp unit cause simultaneous movement of the other clamp unit, whereby movement of the profile remainder by the profile moving means after cutting will move the profile piece through the clamp units and the mechanical connecting means.

7. A machine as claimed in claim 6 wherein the connecting means comprise at least one rigid member connecting the clamp units together a fixed distance apart.

8. A machine as claimed in claim 6 wherein the connecting means comprise clamp centering means for moving the clamp units toward or away from each other.

9. A machine as claimed in claim 6 wherein the connecting means comprise clamp centering means for moving clamp units toward or away from each other in unison, and locking means for selectively locking the clamp centering means to connect the clamp units together a fixed distance apart.

* * * * *